United States Patent
Kondrad et al.

(10) Patent No.: US 10,576,854 B2
(45) Date of Patent: Mar. 3, 2020

(54) BOLSTER SECTIONS FOR A SEATING ASSEMBLY FOR A VEHICLE INCORPORATING A METALLIC SUPPORT ELEMENT AND A METHOD OF MANUFACTURING THE SAME VIA OVERMOLDING THE METALLIC SUPPORT ELEMENT WITH FOAM

(71) Applicant: Ford Global Technologies, LLC, Dearborn, MI (US)

(72) Inventors: Marcos Silva Kondrad, Macomb Township, MI (US); Johnathan Andrew Line, Northville, MI (US); Kevin Mozurkewich, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 15/890,445

(22) Filed: Feb. 7, 2018

(65) Prior Publication Data
US 2019/0241104 A1 Aug. 8, 2019

(51) Int. Cl.
| | |
|---|---|
| *B60N 2/70* | (2006.01) |
| *B60N 2/64* | (2006.01) |
| *B60N 2/90* | (2018.01) |
| *B60N 2/68* | (2006.01) |

(52) U.S. Cl.
CPC ............ *B60N 2/643* (2013.01); *B60N 2/646* (2013.01); *B60N 2/68* (2013.01); *B60N 2/70* (2013.01); *B60N 2/986* (2018.02)

(58) Field of Classification Search
CPC ........ B60N 2/643; B60N 2/986; B60N 2/646; B60N 2/68; B60N 2/70

USPC .................................................... 297/452.29
See application file for complete search history.

(56) References Cited

U.S. PATENT DOCUMENTS

| | | | | |
|---|---|---|---|---|
| 4,607,887 | A * | 8/1986 | Vail | A47C 7/18 297/452.26 |
| 5,000,515 | A | 3/1991 | Deview | |
| 5,437,498 | A | 8/1995 | Waelde | |
| 5,769,498 | A | 6/1998 | Smith et al. | |
| 5,938,232 | A * | 8/1999 | Kalandek | B60R 21/207 280/728.3 |
| 7,040,707 | B2 * | 5/2006 | Nakahara | B60N 2/5621 297/396 |

* cited by examiner

*Primary Examiner* — Mark R Wendell
(74) *Attorney, Agent, or Firm* — David L. Coppiellie; Price Heneveld LLP

(57) ABSTRACT

A method of manufacturing a bolster section for a seating assembly of a vehicle comprising: presenting a first metallic support element that includes a tubular portion; and overmolding the tubular portion of the first metallic support element with foam. The tubular portion of the first metallic support element is bent to a predetermined shape before overmolding the tubular portion of the first metallic support element with foam. A second layer of foam can be applied over the foam overmolded over the tubular portion of the first metallic support element. The second layer of foam can be a different type of foam than the foam overmolded over the tubular portion of the first metallic support element. A first end of the tubular portion can be flattened and an aperture formed therein, to allow the bolster section to be attached to a structural support of a seating assembly of a vehicle.

20 Claims, 28 Drawing Sheets

US 10,576,854 B2

BOLSTER SECTIONS FOR A SEATING ASSEMBLY FOR A VEHICLE INCORPORATING A METALLIC SUPPORT ELEMENT AND A METHOD OF MANUFACTURING THE SAME VIA OVERMOLDING THE METALLIC SUPPORT ELEMENT WITH FOAM

FIELD OF THE INVENTION

The present invention generally relates to a seating assembly for a vehicle utilizing bolsters and a method of manufacturing the same.

BACKGROUND OF THE INVENTION

A seating assembly for a vehicle sometimes employs bolsters to help maintain an occupant in the seating assembly while the vehicle changes direction. High performance vehicles, such as those used for racing, may employ larger and sturdier bolsters than non-high performance vehicles. Bolsters for high performance vehicles often incorporate metal plates that are welded to the structural support of the seat and seatback and welding is expensive and requires metal of high thickness. The resulting bolsters cause discomfort to the occupant.

SUMMARY OF THE INVENTION

According to one aspect of the present invention, a seating assembly for a vehicle comprises: a seat including a structural support and a cushion assembly attached to the structural support; and a seatback cooperating with the seat, the seatback including a structural support and a cushion assembly attached to the structural support; the cushion assembly of the seat comprising: a primary support section; a first bolster section disposed laterally of the primary support section, the first bolster section including a foam portion at least partially surrounding a first metallic support element, the first metallic support element including a tubular portion and at least one aperture receiving a fastener attaching the seat cushion assembly to the structural support of the seat; and a second bolster section disposed laterally of the primary support section and opposite of the first bolster section, the second bolster section including a foam portion at least partially surrounding a second metallic support element, the second metallic support element including a tubular portion and at least one aperture receiving a fastener attaching the seat cushion assembly to the structural support of the seat; and the seatback cushion assembly comprising: a primary support section; a first bolster section disposed laterally of the primary support section, the first bolster section including a foam portion at least partially surrounding a first metallic support element, the first metallic support element including a tubular portion and at least one aperture receiving a fastener attaching the seatback cushion assembly to the structural support of the seatback; and a second bolster section disposed laterally of the primary support section and opposite of the first bolster section, the second bolster section including a foam portion at least partially surrounding a second metallic support element, the second metallic support element including a tubular portion and at least one aperture receiving a fastener attaching the seatback cushion assembly to the structural support of the seatback.

Embodiments of the first aspect of the invention can include any one or a combination of the following features:

regarding the seat cushion assembly, the at least one aperture of the first metallic support element includes a first aperture and a second aperture separated by the tubular portion of the first metallic support element, and both the first aperture and the second aperture each receive a fastener attaching the seat cushion assembly to the structural support of the seat;

regarding the seat cushion assembly, the at least one aperture of the second metallic support element includes a first aperture and a second aperture separated by the tubular portion of the second metallic support element, and both the first aperture and the second aperture each receive a fastener attaching the seat cushion assembly to the structural support of the seat;

regarding the seatback cushion assembly, the at least one aperture of the first metallic support element includes a first aperture and a second aperture separated by the tubular portion of the first metallic support element, and both the first aperture and the second aperture each receive a fastener attaching the seatback cushion assembly to the structural support of the seatback;

regarding the seatback cushion assembly, the at least one aperture of the second metallic support element includes a first aperture and a second aperture separated by the tubular portion of the second metallic support element, and both the first aperture and the second aperture each receive a fastener attaching the seatback cushion assembly to the structural support of the seatback;

the primary support section of the seat cushion assembly includes a foam portion;

the primary support section of the seatback cushion assembly includes a foam portion;

regarding the seat cushion assembly, the foam portions of the primary support section, the first bolster section, and the second bolster section are contiguous;

regarding the seatback cushion assembly, the foam portions of the primary support section, the first bolster section, and the second bolster section are contiguous;

the seat cushion assembly further comprising a second layer of foam covering at least a portion of the contiguous foam portions of the primary support section, the first bolster section, and the second bolster section;

the seatback cushion assembly further comprising a second layer of foam covering at least a portion of the contiguous foam portions of the primary support section, the first bolster section, and the second bolster section;

regarding the seat cushion assembly, the second layer of foam is a different type of foam than the contiguous foam portions of the primary support section, the first bolster section, and the second bolster section;

regarding the seatback cushion assembly, the second layer of foam is a different type of foam than the contiguous foam portions of the primary support section, the first bolster section foam portion, and the second bolster section;

regarding the seat cushion assembly, the second layer of foam is a polyurethane foam;

regarding the seat cushion assembly, the contiguous foam portions of the primary support section, the first bolster section, and the second bolster section is an expanded polypropylene foam;

regarding the seatback cushion assembly, the second layer of foam is a polyurethane foam;

regarding the seatback cushion assembly, the contiguous foam portions of the primary support section, the first bolster section, and the second bolster section is an expanded polypropylene foam;

a midline dividing the seating assembly into a first side and a second side;

the structural support of the seat includes at least one aperture disposed at the first side of the midline and at least one aperture disposed at the second side of seating assembly;

the at least one aperture of the first bolster section of the seat cushion assembly and the at least one aperture of the structural support of the seat disposed at the first side of the seating assembly are disposed in-line with each other and receive the same fastener attaching the seat cushion assembly to the structural support of the seat;

the at least one aperture of the second bolster section of the seat cushion assembly and the at least one aperture of the structural support of the seat at the second side of the seating assembly are disposed in-line with each other and receive the same fastener attaching the seat cushion assembly to the structural support of the seat;

the structural support of the seatback including at least one aperture disposed at the first side of the seating assembly and at least one aperture disposed at the second side of the seating assembly;

the at least one aperture of the first bolster section of the seatback cushion assembly and the at least one aperture of the structural support of the seatback disposed at the first side of the seating assembly are disposed in-line with each other and receive the same fastener attaching the seatback cushion assembly to the structural support of the seatback;

the at least one aperture of the second bolster section of the seatback cushion assembly and the second aperture of the structural support of the seatback are disposed in-line with each other and receive the same fastener attaching the seatback cushion assembly to the structural support of the seatback;

the at least one aperture of the structural support of the seat disposed at the first side of the seating assembly is closer to the midline of the seating assembly than the at least one aperture of the first bolster section;

the at least one aperture of the structural support of the seat disposed at the second side of the seating assembly is closer to the midline of the seating assembly than the at least one aperture of the second bolster section;

the first metallic support element of the seatback cushion assembly comprises a first end and a second end, with the tubular portion of the first metallic support element of the seatback cushion assembly disposed between the first end and the second end of the first metallic support element of the seatback cushion assembly; and the tubular portion of the first metallic support element of the seatback cushion assembly includes a plurality of bends such that a distance between two of the plurality of bends forward of the first end and the second end of the first metallic support element of the seatback cushion assembly is greater than the distance between the first end and the second end of the first metallic support element of the seatback cushion assembly.

According to a second aspect of the present invention, a cushion assembly for a seating assembly of a vehicle comprises: a primary support section; a first bolster section disposed laterally of the primary support section, the first bolster section including a foam portion at least partially surrounding a first metallic support element, the first metallic support element including a tubular portion and at least one aperture configured to receive a fastener to fasten the cushion assembly to a structural support; and a second bolster section disposed laterally of the primary support section and opposite of the first bolster section, the second bolster section including a foam portion at least partially surrounding a second metallic support element, the second metallic support element including a tubular portion and at least one aperture configured to receive a fastener to fasten the cushion assembly to a support structure.

Embodiments of the second aspect of the invention can include any one or a combination of the following features:
the first metallic support element is U-shaped;
the second metallic support element is U-shaped;
the at least one aperture of the first metallic support element configured to receive a fastener to fasten the cushion assembly to a support structure includes a first aperture and a second aperture separated by the tubular portion of the first metallic support element;
the at least one aperture of the second metallic support element configured to receive a fastener to fasten the cushion assembly to a support structure includes a first aperture and a second aperture separated by the tubular portion of the second metallic support element;
the foam portion of the first bolster section surrounds at least part of the tubular portion of the first bolster section but does not surround the at least one aperture of the first bolster section configured to receive a fastener to fasten the cushion assembly to a structural support;
the foam portion of the second bolster section surrounds at least part of the tubular portion of the second bolster section but does not surround the at least one aperture of the second bolster section configured to receive a fastener to fasten the cushion assembly to a support structure;
the primary support section includes a foam portion;
the foam portions of the primary support section, the first bolster section, and the second bolster section are contiguous;
a second layer of foam covering at least a portion of the contiguous foam portions of the primary support section, the first bolster section, and the second bolster section;
the second layer of foam is a different type of foam than the contiguous foam portions of the primary support section, the first bolster section, and the second bolster section;
the second layer of foam is a polyurethane foam; and
the contiguous foam portions of the primary support section, the first bolster section, and the second bolster section are an expanded polypropylene foam.

According to a third aspect of the present invention, a method of manufacturing a bolster section for a seating assembly of a vehicle comprises: presenting a first metallic support element that includes a tubular portion; and overmolding the tubular portion of the first metallic support element with foam.

Embodiments of the third aspect of the invention can include any one or a combination of the following features:
bending the tubular portion of the first metallic support element to a predetermined shape before overmolding the tubular portion of the first metallic support element with foam;
flattening a first end of the tubular portion and form an aperture through the first end;

applying a second layer of foam over the foam overmolded over the tubular portion of the first metallic support element;

the second layer of foam is a different type of foam than the foam overmolded over the tubular portion of the first metallic support element;

the predetermined shape of the tubular portion of the first metallic support element is a U-shape; and the predetermined shape of tubular portion of the first metallic support element has at least five bends.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
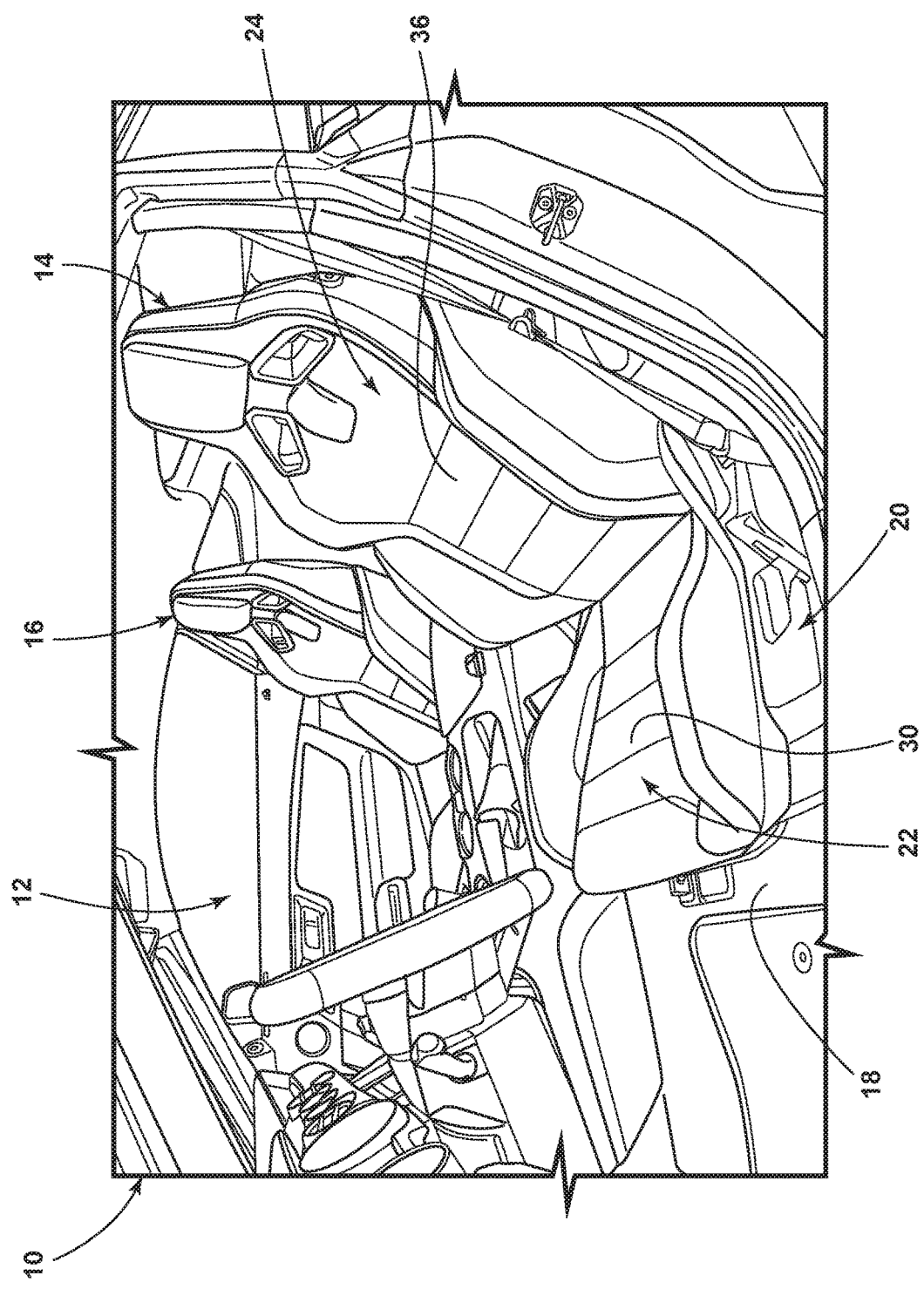
FIG. 1 is a perspective view of an interior of a vehicle, illustrating a first seating assembly with a seatback and a seat disposed above a floor.

For purposes of description herein, the terms "above," "inboard," "outboard," "forward," "upward," "rearward," "downward," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle 10 includes an interior 12. A first seating assembly 14 and a second seating assembly 16, disposed next to the first seating assembly 14, are disposed in the interior 12 above a floor 18 and form a first row of seating 20. The first seating assembly 14 can be designated to support an operator occupant (not illustrated) of the vehicle 10. The second seating assembly 16 can be designated to support a passenger occupant (not illustrated) of the vehicle 10. Because the second seating assembly 16 can be identical in all respects to the first seating assembly 14 for purposes of this disclosure, only the first seating assembly 14 will be particularly discussed herein. The vehicle 10 can be a high performance automobile, such as a racecar, or any other type of vehicle such as non-high performance car, truck, sports utility vehicle, and so on.

Figure 2:
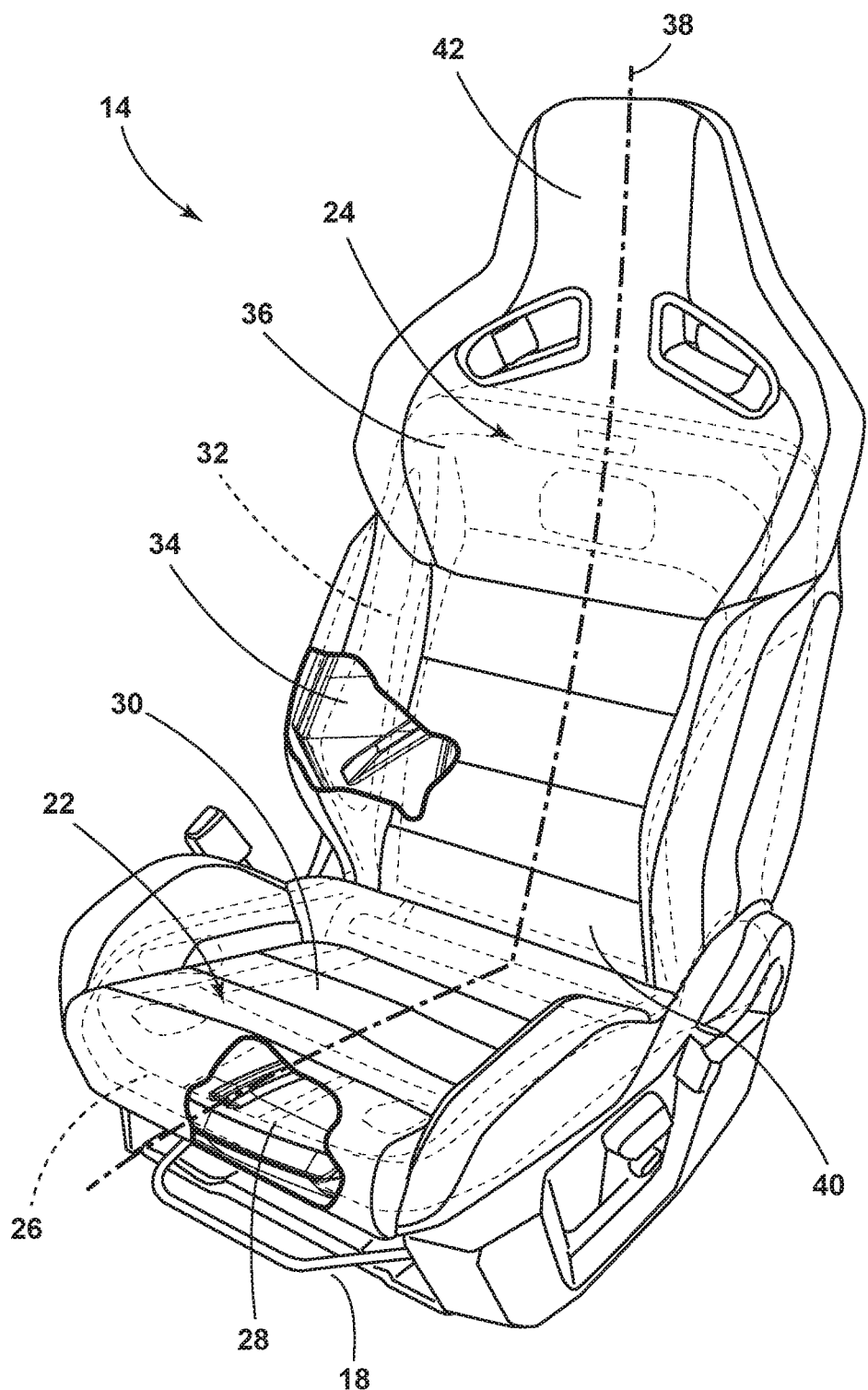
FIG. 2 is a perspective view of the first seating assembly of FIG. 1, illustrating both the seat and seatback having a structural support, a cushion assembly over the structural support, and a covering covering the cushion assembly.

Referring now to FIG. 2, the first seating assembly 14 includes a seat 22 and a seatback 24 cooperating with the seat 22 to support the occupant. The seat 22 includes a structural support 26. The structural support 26 is attached to the floor 18 of the vehicle 10. The structural support 26 can be a frame. The seat 22 further includes a cushion assembly 28 attached to the structural support 26. The cushion assembly 28 provides comfort to the occupant of the first seating assembly 14. The seat 22 can further include a covering 30, which can be a fabric (e.g., cloth, leather), disposed over the cushion assembly 28.

The seatback 24 likewise includes a structural support 32, which can be a frame. The structural support 32 can be pivotally attached to the structural support 26 of the seat 22, allowing the occupant to position the seatback 24 within an angular range of positions relative to the seat 22. The seatback 24 further includes a cushion assembly 34 attached to the structural support 32. The cushion assembly 34 provides comfort to the occupant of the first seating assembly 14. The seatback 24 can further include a covering 36 disposed over the cushion assembly 34. A midline 38 divides the first seating assembly 14 into a first side 40 and a second side 42, which may be at least approximately symmetrical to each other. The first side 40, in the illustrated embodiment, is outboard of the second side 42.

Referring now to FIGS. 3-13, the cushion assembly 28 of the seat 22 is functionally divided into a primary support section 44, a first bolster section 46, and a second bolster section 48. The primary support section 44 is the section of the cushion assembly 28 that supports the occupant of the first seating assembly 14 when the vehicle 10 is idle or moving in the general forward direction. The primary support section 44 can provide a top surface 50 and a bottom surface 52. The top surface 50 faces generally upward. The bottom surface 52 generally faces the floor 18 of the vehicle 10. The primary support section 44 includes a forward end 54 and a rear end 56. The forward end 54 faces generally forward. The rear end 56 faces generally rearward. The primary support section 44 includes a foam portion 58.

The first bolster section 46 is disposed laterally of the primary support section 44. The second bolster section 48 is also disposed laterally of the primary support section 44, opposite of the first bolster section 46. In other words, the first bolster section 46 can be disposed outboard of the primary support section 44 and the second bolster section 48 can be disposed inboard of the primary support section 44. The first bolster section 46 and the second bolster section 48 support the occupant and help maintain the occupant in the first seating assembly 14 when the vehicle 10 changes direction (such as when turning). The first bolster section 46 and the second bolster section 48 provide an inward surface 60, 62, respectively, which is the surface closest to the occupant while the first bolster section 46 or the second bolster section 48, respectively, support the occupant. The inward surfaces 60, 62 extend generally upward and outward from the primary support section 44, such as the top surface 50 thereof. The inward surfaces 60, 62 face generally inward and upward. The inward surfaces 60, 62 can form an obtuse angle 64, 66 (see FIG. 4), respectively, with the top surface 50 of the primary support section 44.

The first bolster section 46 includes a first metallic support element 68 and a foam portion 70 at least partially surrounding the first metallic support element 68. The first metallic support element 68 provides a support structure to help the first bolster section 46 maintain its shape and position and to counteract the force that the occupant imposes on the first bolster section 46 while the vehicle 10 is changing direction. In addition, the first metallic support element 68 provides the structure to attach the cushion assembly 28 of the seat 22 to the structural support 26 of the seat 22. As potentially best illustrated in FIGS. 10 and 11, the first metallic support element 68 can be U-shaped. The foam portion 70 provides cushioning and comfort for the occupant of the first seating assembly 14 when the vehicle 10 changes direction and the occupant interacts with the first bolster section 46.

The first metallic support element 68 can include a tubular portion 72 between a first end 74 and a second end 76. Alternatively, the first metallic support element 68 can be rod-like, without a hollowed interior that the tubular portion 72 provides. A tubular portion 72 utilizes less material and thus weighs less than a rod-like first metallic support element 68. The first metallic support element 68 further includes at least one aperture, such as a first aperture 78 disposed at the first end 74 and a second aperture 80 disposed at the second end 76, configured and positioned, as discussed below (see FIG. 25), to receive fasteners 82*a*, 82*b* to attach (e.g., fasten) the cushion assembly 28 of the seat 22 to the structural support 26 of the seat 22. The first end 74 and the second end 76 of the first metallic support element 68 is disposed rearward of the forward end 54 of the primary support section 44 and forward of the rear end 56 of the primary support section 44. The first aperture 78 can be disposed forward of the second aperture 80. The rod-like or tubular portion 72 separates the first aperture 78 and the second aperture 80. In the illustrated embodiment, the first metallic support element 68 has a generally upside-down U-shape with the first end 74 and the second end 76 pointing downward from the rod-like or tubular portion 72. The foam portion 70 of the first bolster section 46 surrounds at least part of the rod-like or tubular portion 72 of the first bolster section 46. In the illustrated embodiment, the foam portion 70 of the first bolster section 46 does not surround the at least one aperture (e.g., the first aperture 78 and the second aperture 80) of the first bolster section 46, allowing the first aperture 78 and the second aperture 80 to receive fasteners 82*a*, 82*b*, as discussed below, to fasten the cushion assembly 28 to the structural support 26. The foam portion 70, however, surrounds most of the rod-like or tubular portion 72 between the first aperture 78 and the second aperture 80.

The second bolster section 48 includes a second metallic support element 84 and a foam portion 86 at least partially surrounding the second metallic support element 84. The second metallic support element 84 provides support structure to help the second bolster section 48 maintain its shape and position and to counteract the force that the occupant imposes on the second bolster section 48 while the vehicle 10 is changing direction. In addition, the second metallic support element 84, together with the first metallic support element 68, provides the structure to attach the cushion assembly 28 of the seat 22 to the structural support 26 of the seat 22. As potentially best illustrated in FIGS. 12 and 13, the second metallic support element 84 can be U-shaped. The foam portion 86 provides cushioning and comfort for the occupant of the first seating assembly 14 when the vehicle 10 changes direction and the occupant interacts with the second bolster section 48.

The second metallic support element 84 can include a tubular portion 88 between a first end 90 and a second end 92. Alternatively, the second metallic support element 84 can be rod-like, without a hollowed interior that the tubular portion 88 provides. A tubular portion 88 utilizes less material and thus weighs less than a rod-like second metallic support element 84. The second metallic support element 84 further includes at least one aperture, such as a first aperture 94 disposed at the first end 90 and a second aperture 96 disposed at the second end 92, configured and positioned, as discussed below (see FIG. 26), to receive fasteners 82*c*, 82*d* to attach (e.g., fasten) the cushion assembly 28 of the seat 22 to the structural support 26 of the seat 22. The first end 90 and the second end 92 of the second metallic support element 84 is disposed rearward of the forward end 54 of the primary support section 44 and forward of the rear end 56 of the primary support section 44. The first aperture 94 can be disposed generally forward of the second aperture 96. The rod-like or tubular portion 88 separates the first aperture 94 and the second aperture 96. In the illustrated embodiment, the second metallic support element 84 has a generally upside-down U-shape with the first end 90 and the second end 92 pointing downward from the rod-like or tubular portion 72. The foam portion 86 of the second bolster section 48 surrounds at least part of the rod-like or tubular portion 88 of the second metallic support element 84. In the illustrated embodiment, the foam portion 86 surrounds most of the tubular portion 88 between the first aperture 94 and the second aperture 96. In the illustrated embodiment, the foam portion 86 of the second bolster section 48 does not surround the at least one aperture of the second metallic support element 84 (i.e., the first aperture 94 and the second aperture 96), allowing the first aperture 94 and the second aperture 96 to receive the fasteners 82*c*, 82*d*, respectively, as discussed below, to fasten the cushion assembly 28 to the structural support 26.

Figure 3:
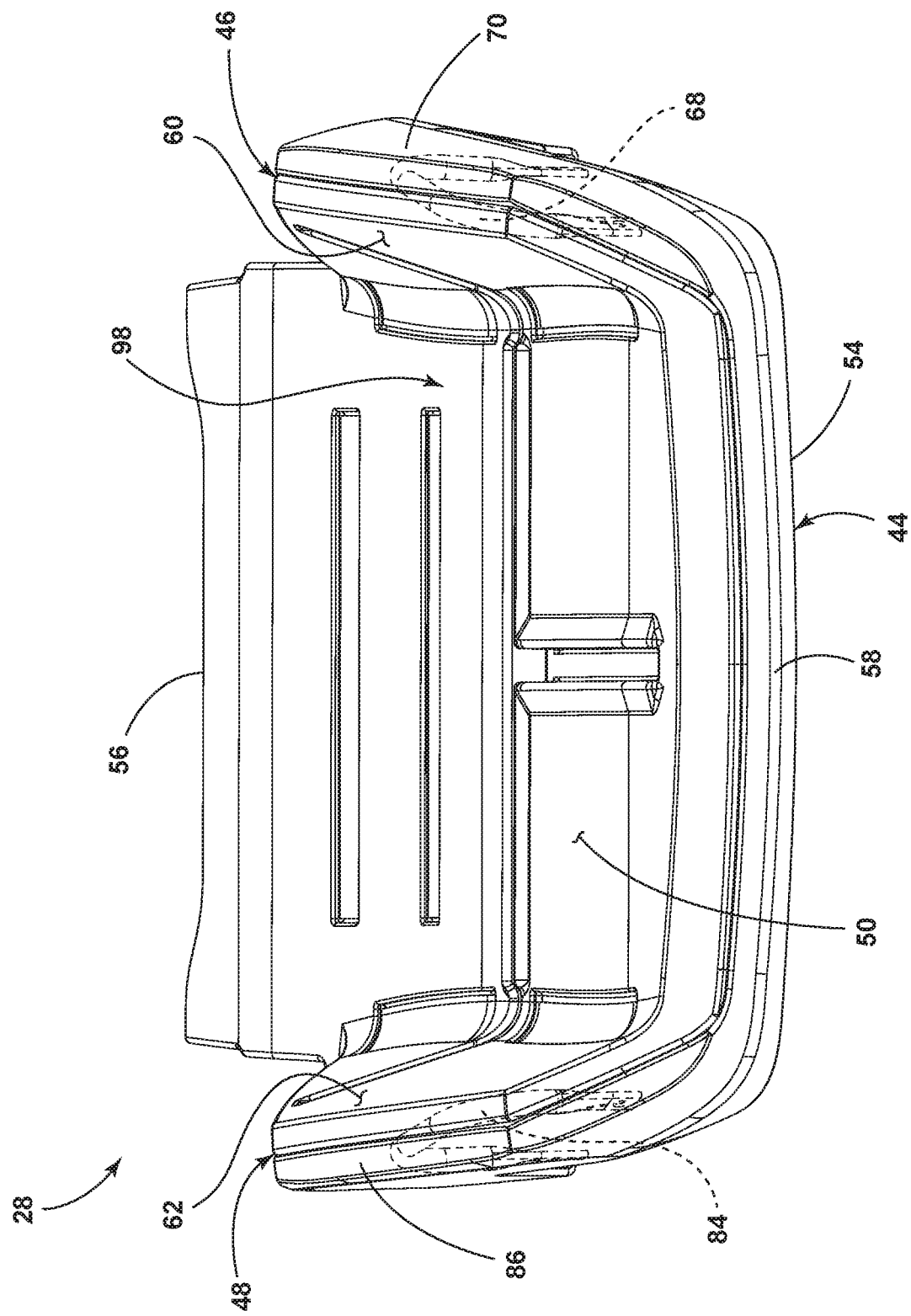
FIG. 3 is a front perspective view of the cushion assembly of the seat of FIG. 2, illustrating a primary support section, a first bolster section disposed to one side of the primary support section, and a second bolster section disposed to the other side of the primary support section opposing the first bolster section.
Figure 3A:
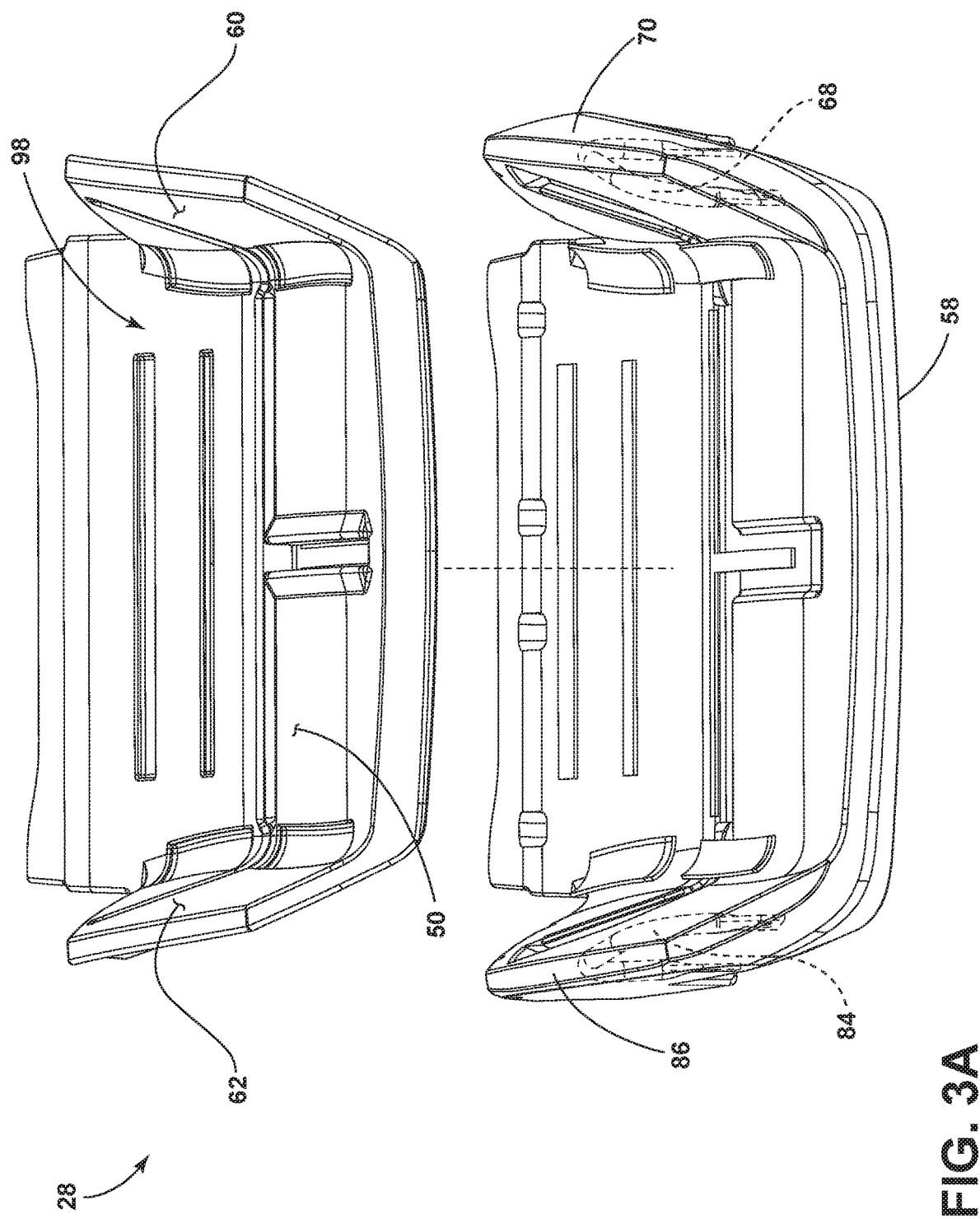
FIG. 3A is a blown-up front perspective view of the cushion assembly of the seat of FIG. 2, illustrating a second layer of foam disposed above and partially enveloped by contiguous foam portions of the primary support section, the first bolster section, and the second bolster section.
Figure 4:
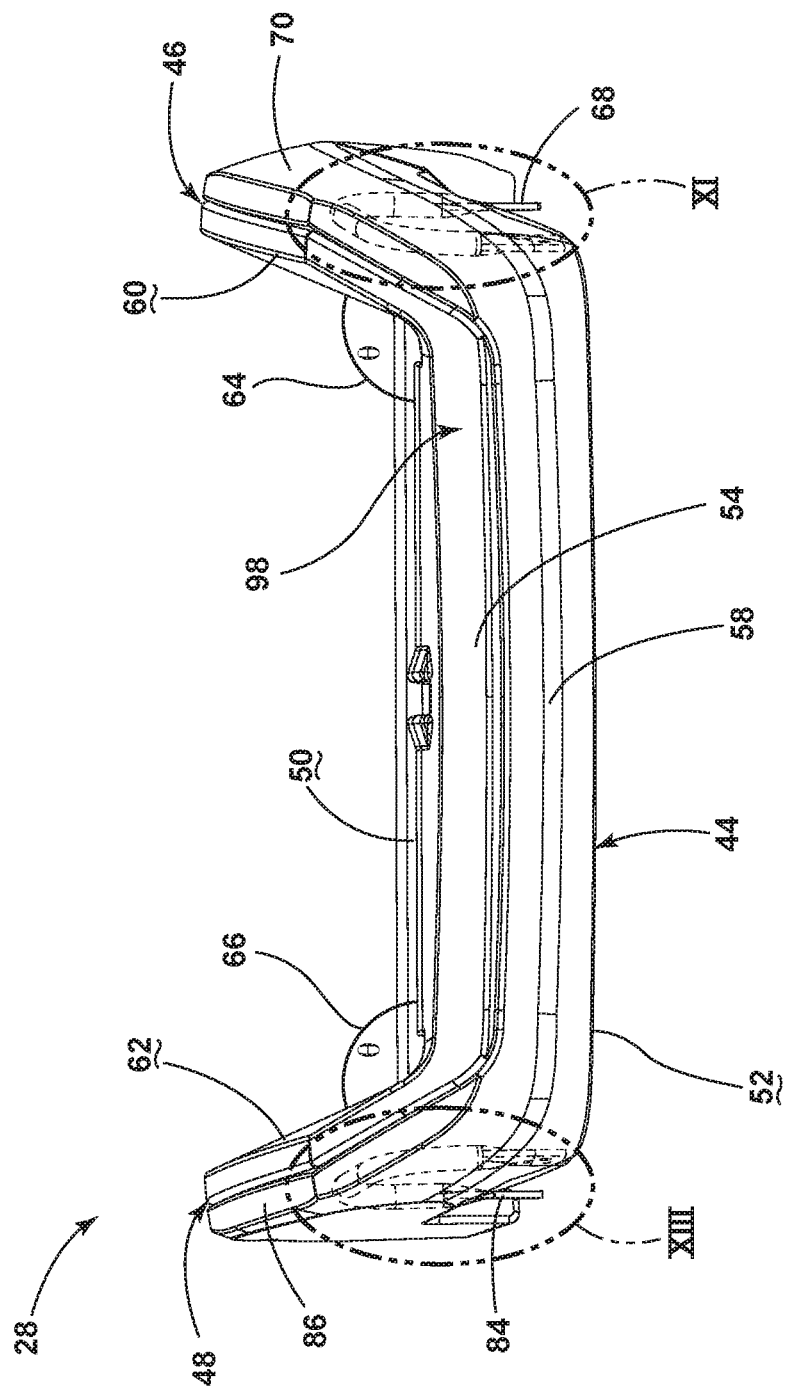
FIG. 4 is a front view of the cushion assembly of the seat of FIG. 2, illustrating the first bolster section and the second bolster section each having an inward surface that forms an obtuse angle relative to a top surface of the primary support section.
Figure 5:
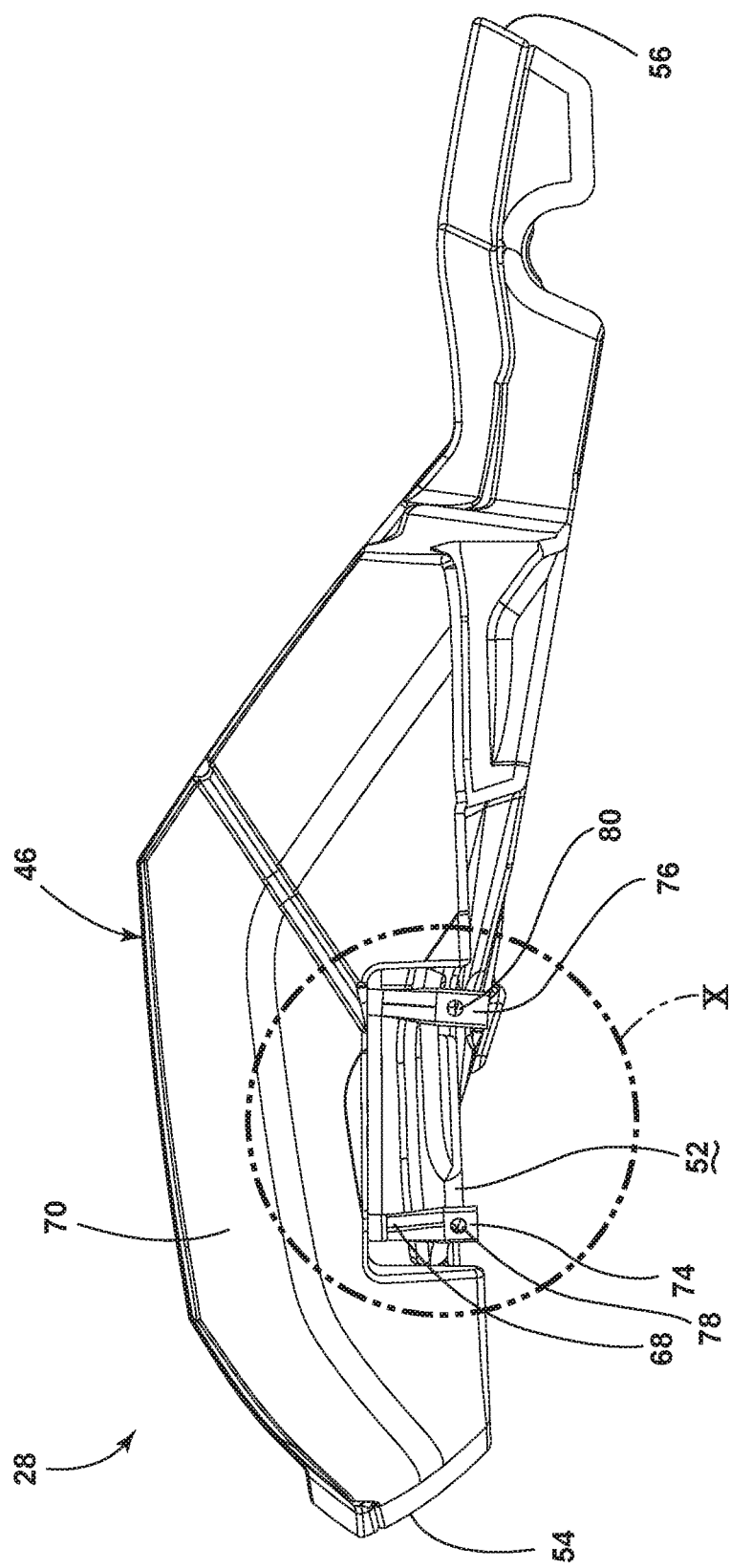
FIG. 5 is a side view of the cushion assembly of the seat of FIG. 2, illustrating a forward end and a rear end, as well as a first metallic support element at least partially disposed within a foam portion (as a result of an overmolding manufacturing method) of the first bolster section.
Figure 6:
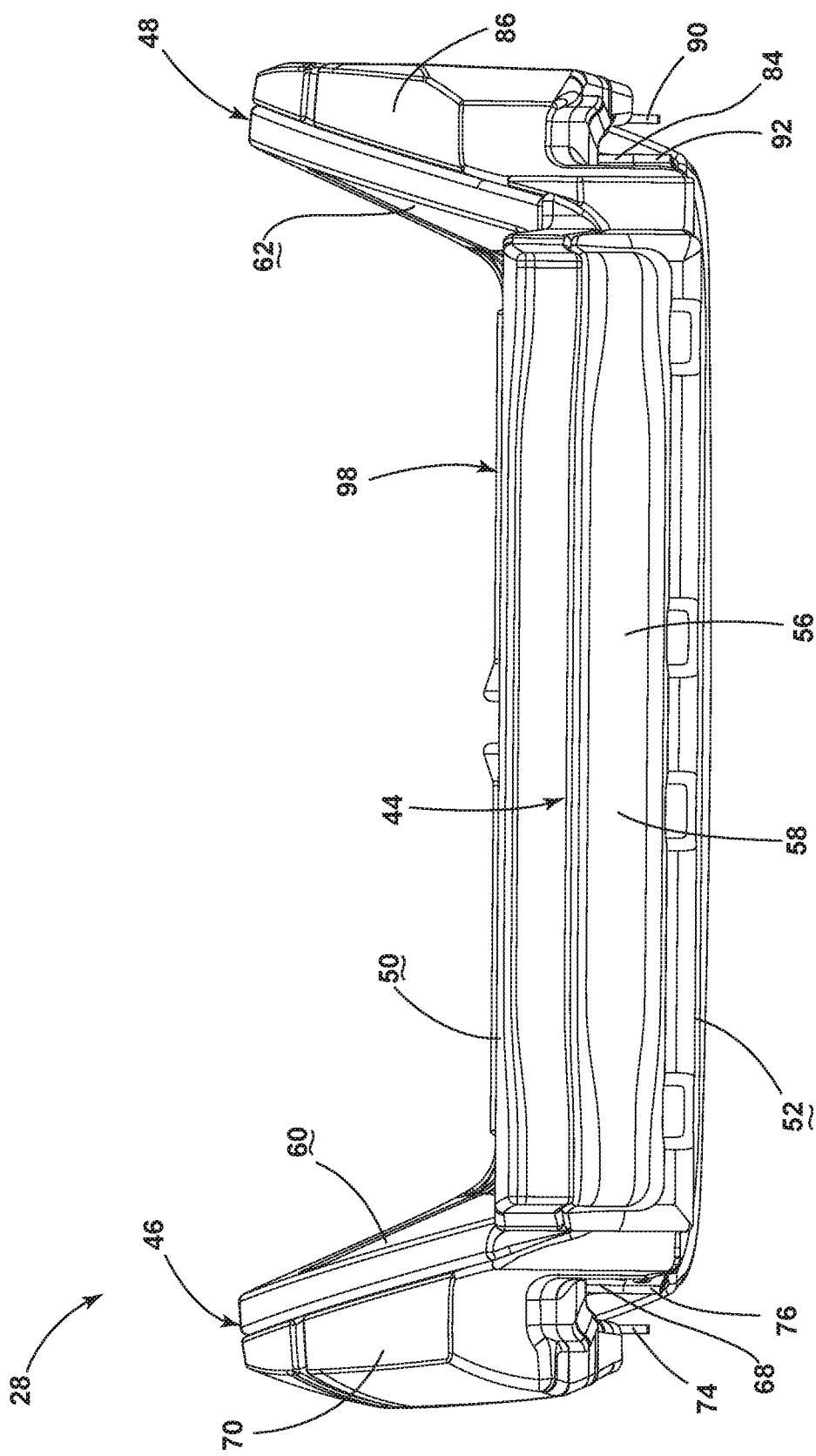
FIG. 6 is a rear view of the cushion assembly of the seat of FIG. 2, illustrating the second layer of foam disposed above and partially enveloped by contiguous foam portions of the primary support section, the first bolster section, and the second bolster section.
Figure 7:
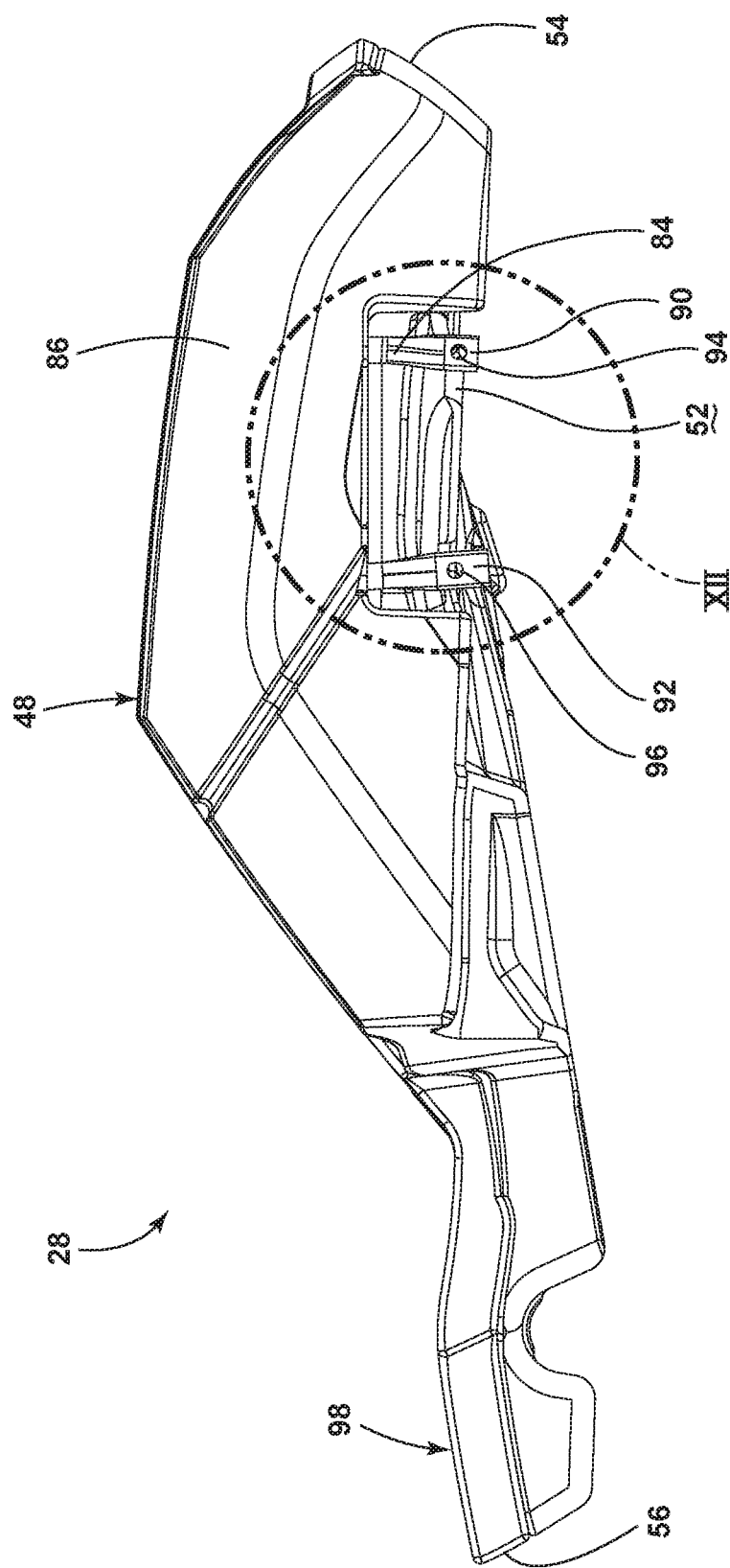
FIG. 7 is another side view (opposite side as FIG. 5) of the cushion assembly of the seat of FIG. 2, illustrating a second metallic support element at least partially disposed within a foam portion (as a result of overmolding manufacturing method) of the second bolster section.
Figure 8:
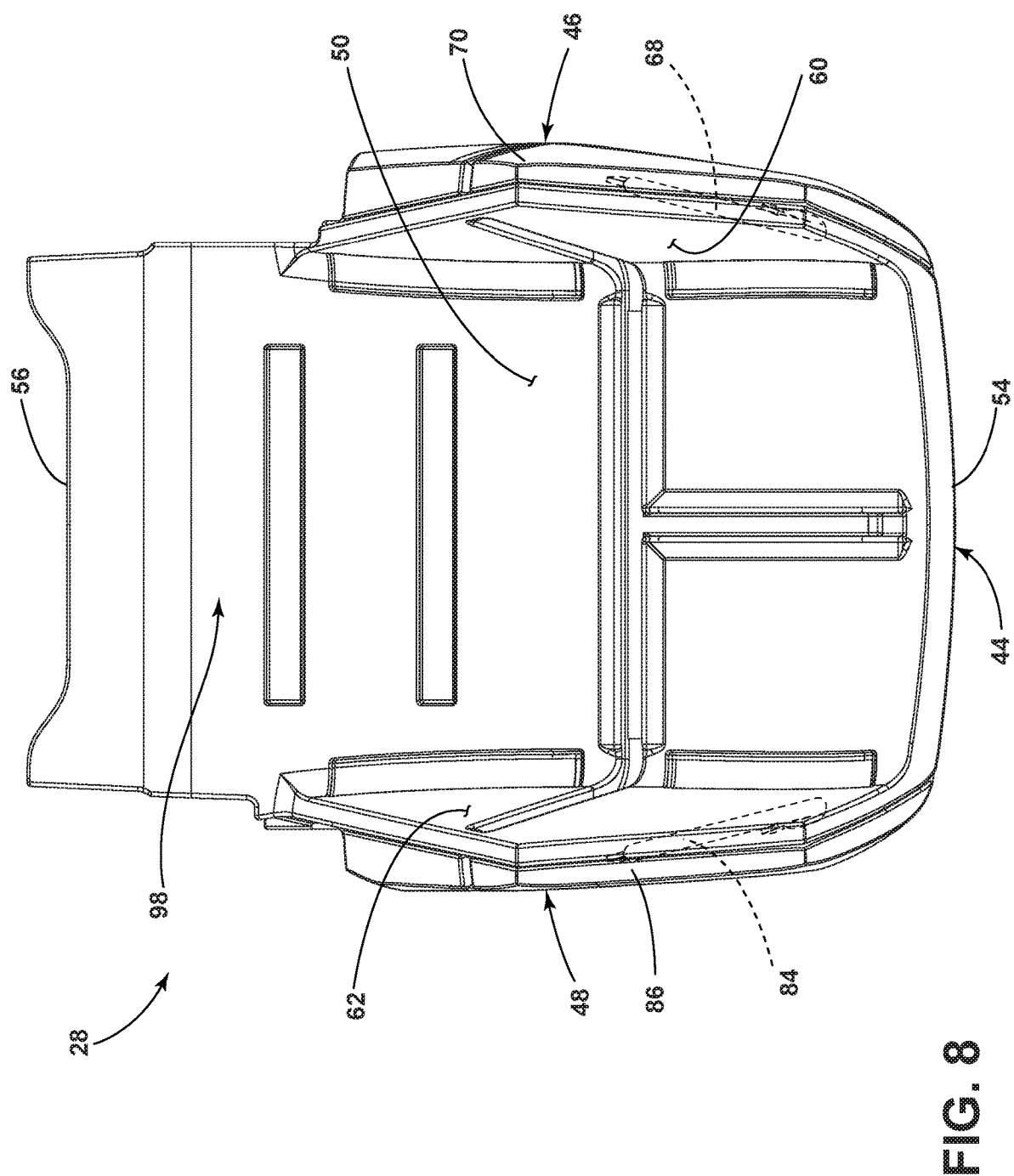
FIG. 8 is a top view of the cushion assembly of the seat of FIG. 2, illustrating the first bolster section and the second bolster section extending generally upward and outward from the primary support section.
Figure 9:
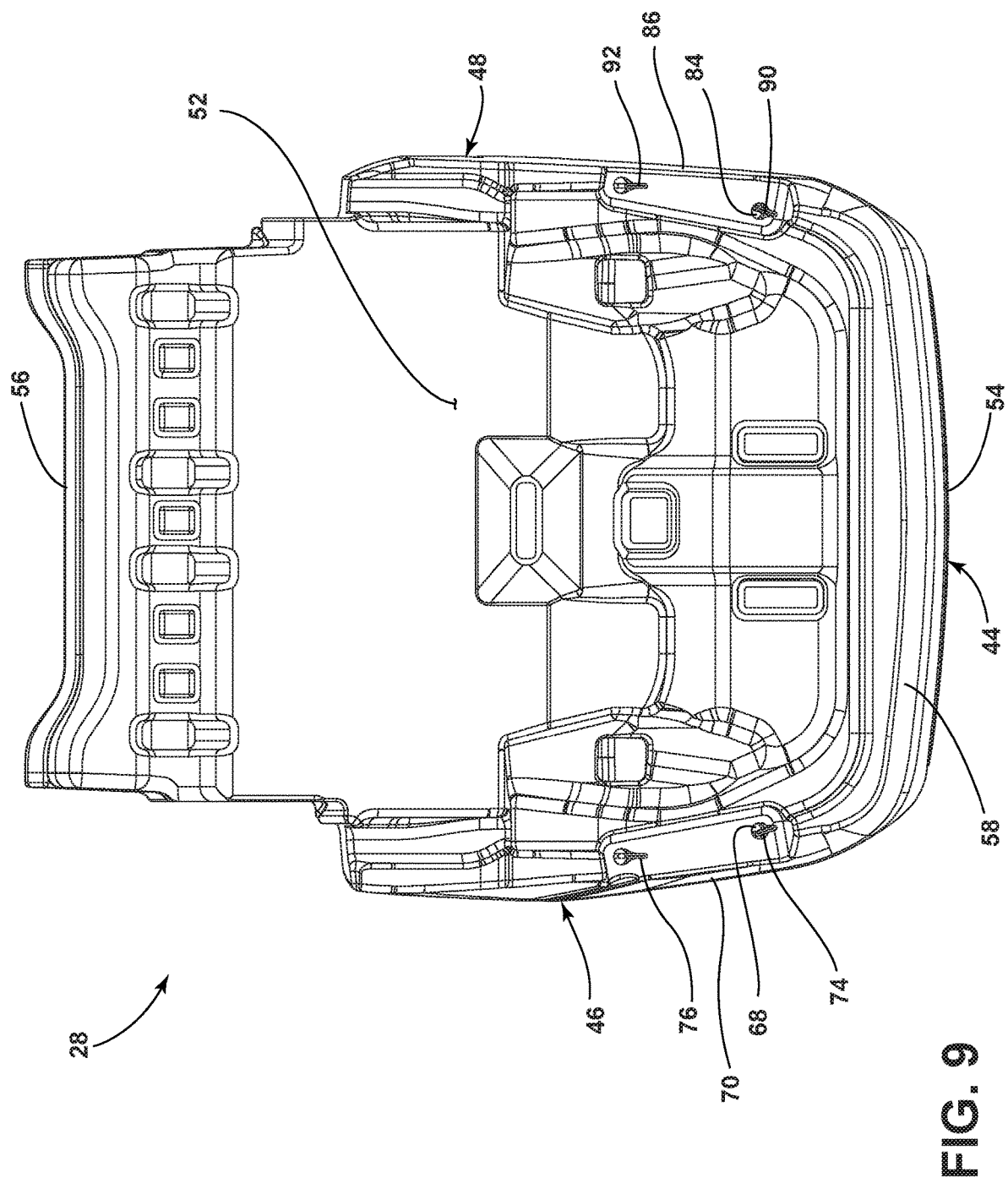
FIG. 9 is a bottom view of the cushion assembly of the seat of FIG. 2, illustrating the first metallic support element and the second metallic support element each having a first end and a second end extending from the foam portions of the first bolster section and the second bolster section, respectively.
Figure 10:
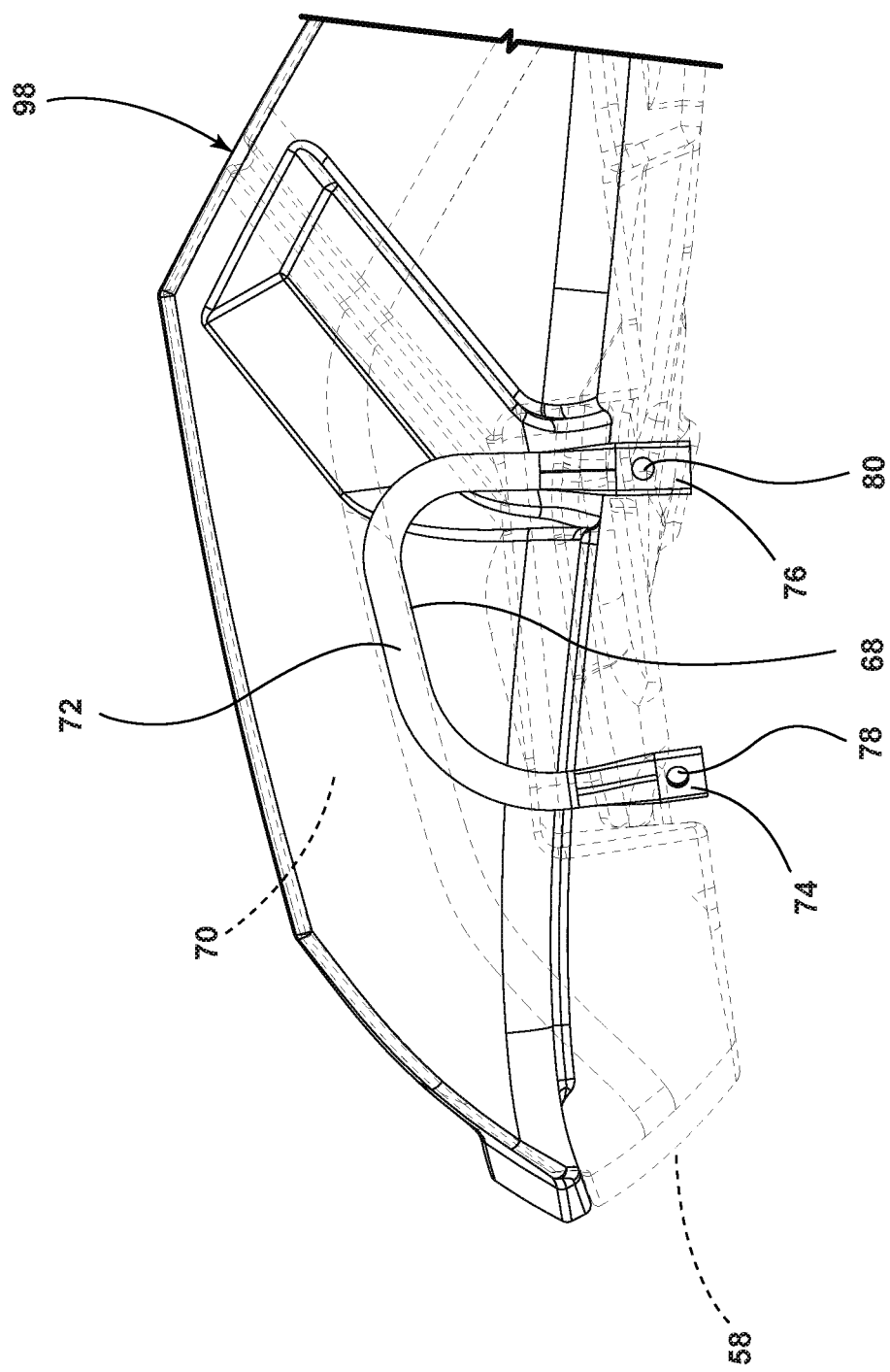
FIG. 10 is a side view of area X of FIG. 5, with the foam portions of the first bolster section and primary support section shown in phantom, illustrating the first metallic support element having a tubular portion between the first end and the second end, and each of the first end and the second end incorporating an aperture to allow the attachment of the cushion assembly of the seat to the structural support of the seat.
Figure 11:
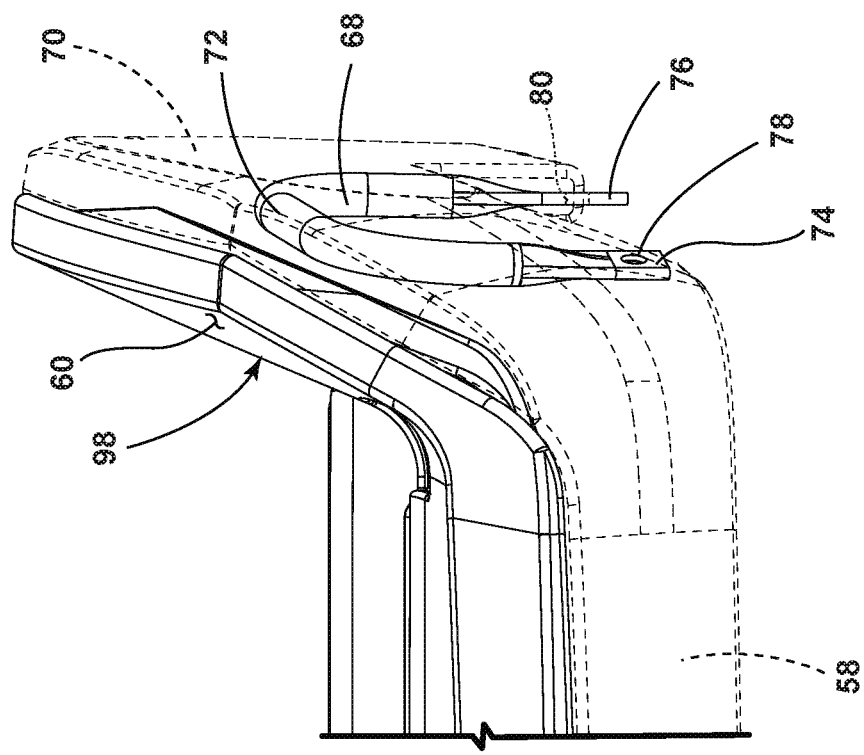
FIG. 11 is a front view of area XI of FIG. 4, with the foam portions of the first bolster section and primary support section shown in phantom, illustrating the first metallic support element, including the tubular portion thereof taking a general U-shape.
Figure 12:
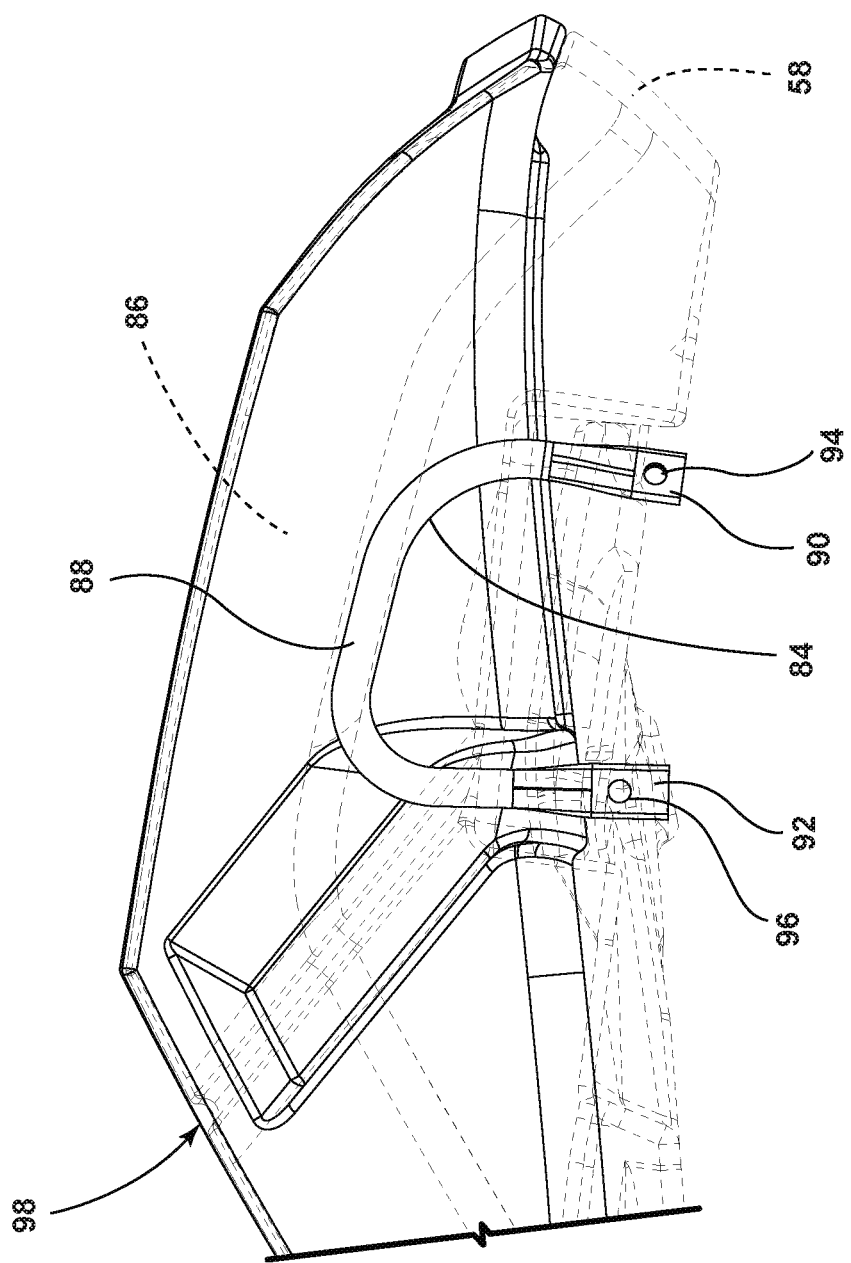
FIG. 12 is a side view of area XII of FIG. 7, with the foam portions of the second bolster section and primary support section shown in phantom, illustrating the second metallic support element having a tubular portion between the first end and the second end, and each of the first end and the second end incorporating an aperture to allow the attachment of the cushion assembly of the seat to the structural support of the seat.
Figure 13:
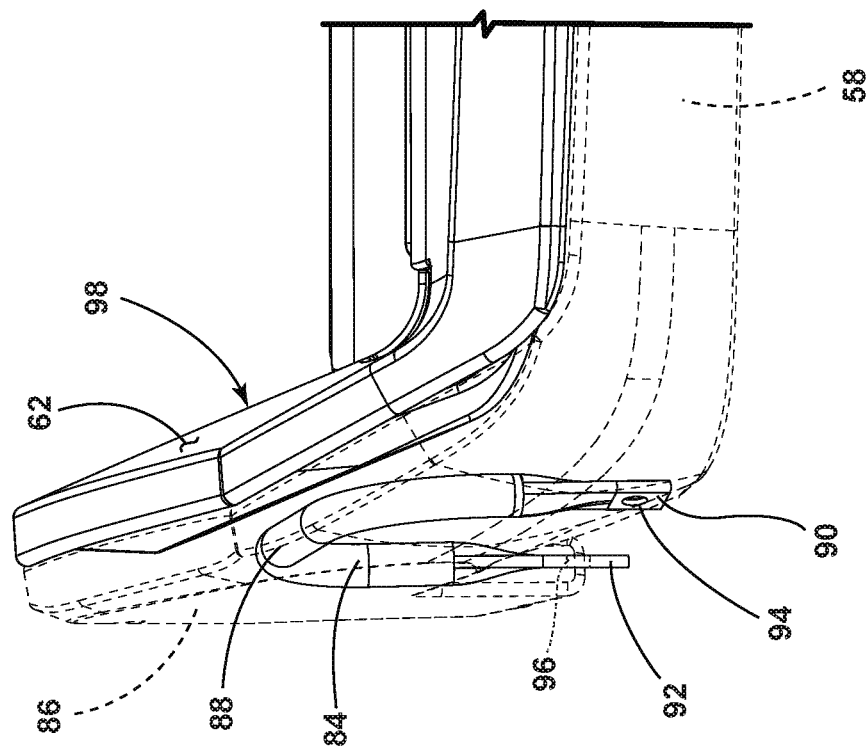
FIG. 13 is a front view of area XIII of FIG. 4, with the foam portions of the second bolster section and primary support section shown in phantom, illustrating the second metallic support element, including the tubular portion thereof taking a general U-shape.
Figure 14:
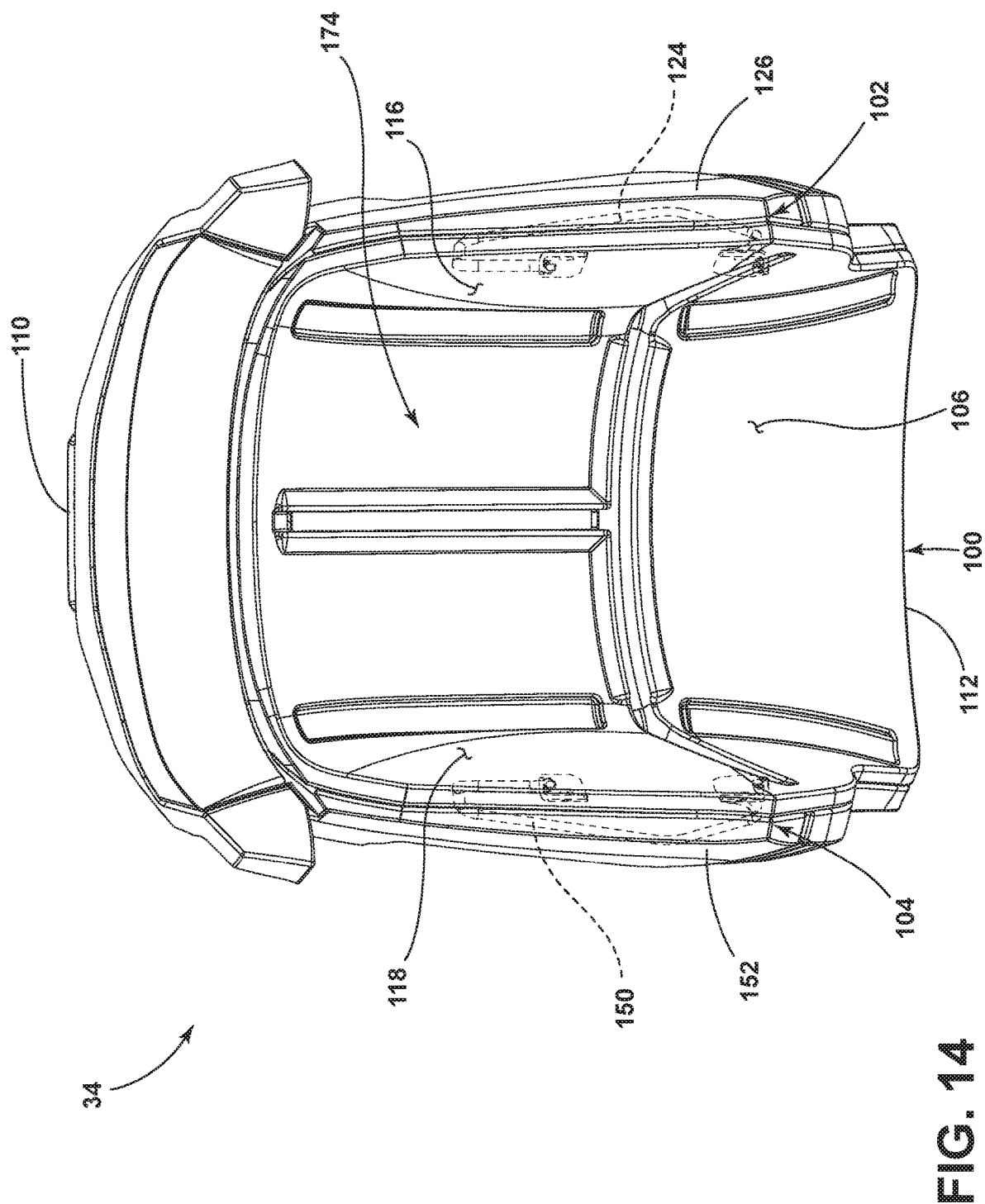
FIG. 14 is a front view of the cushion assembly of the seatback of FIG. 2, illustrating a primary support section, a first bolster section disposed to one side of the primary support section, and a second bolster section disposed to the other side of the primary support section and opposing the first bolster section.

As mentioned above, the primary support section 44 of the cushion assembly 28 of the seat 22 also includes a foam portion 58. As perhaps best illustrated in FIG. 3A, in the illustrated embodiment, the foam portion 58 of the primary support section 44, the foam portion 70 of the first bolster section 46, and the foam portion 86 of the second bolster section 48 are contiguous, but need not be. The primary support section 44, the first bolster section 46, and the second bolster section 48 of the cushion assembly 28 of the seat 22 can further include a second layer of foam 98, which also may be contiguous, and is in the illustrated embodiment, that covers at least a portion of the foam portions 58, 70, 86 of the primary support section 44, the first bolster section 46, and the second bolster section 48, respectively. The second layer of foam 98 can be a different type of foam than the foam portions 58, 70, 86 of the primary support section 44, the first bolster section 46, and the second bolster section 48, respectively. For example, the second layer of foam 98 can be a polyurethane foam, while the foam portions 58, 70, 86 of the primary support section 44, the first bolster section 46, and the second bolster section 48, respectively, can be an expanded polypropylene foam. The inward surfaces 60, 62, of the first bolster section 46 and the second bolster section 48, respectively, and the top surface 50 of the primary support section 44, can be disposed on (i.e., provided by) the second layer of foam 98. The bottom surface 52 of the primary support section 44 can be disposed on (i.e., provide by) the foam portion 58.

Referring now to FIGS. 14-24, the cushion assembly 34 for the seatback 24 likewise includes a primary support section 100, a first bolster section 102, and a second bolster section 104. The primary support section 100 is the section of the cushion assembly 34 of the seatback 24 that primarily supports a back of the occupant of the first seating assembly 14 when the vehicle 10 is moving in a forward direction or is sitting idle. The primary support section 100 can provide a forward facing surface 106 and a rearward facing surface 108. The forward facing surface 106 generally faces forward and toward the occupant of the first seating assembly 14. The rearward facing surface 108 faces generally rearward and away from the occupant of the first seating assembly 14. The primary support section 100 includes a top 110 and a bottom 112. The top 110 faces generally upward, while the bottom 112 faces generally downward and is disposed closer to the seat 22 than the top 110. The primary support section 100 includes a foam portion 114.

The first bolster section 102 of the cushion assembly 34 for the seatback 24 is disposed laterally of the primary support section 100. The second bolster section 104 is also disposed laterally of the primary support section 100, opposite of the first bolster section 102. In other words, the first bolster section 102 can be disposed outboard of the primary support section 100 and the second bolster section 104 can be disposed inboard of the primary support section 100. The first bolster section 102 and the second bolster section 104 support the occupant and help maintain the occupant in the first seating assembly 14 when the vehicle 10 changes direction (such as when turning). The first bolster section 102 and the second bolster section 104 provide an inward surface 116, 118, respectively, which is the surface closest to the occupant while the first bolster section 102 or the second bolster section 104, respectively, support the occupant. The inward surfaces 116, 118 extend generally forward and outward from the primary support section 100, such as the forward facing surface 106 thereof. The inward surfaces 116, 118 face generally forward and inward. The inward surfaces 116, 118 can form an obtuse angle 120, 122, respectively, with the forward facing surface 106 of the primary support section 100 (see, e.g., FIG. 20).

The first bolster section 102 includes a first metallic support element 124 and a foam portion 126 at least partially surrounding the first metallic support element 124. The first metallic support element 124 provides support structure to help the first bolster section 102 maintain its shape and position and to counteract the force the occupant imposes on the first bolster section 102 while the vehicle 10 is changing direction. In addition, the first metallic support element 124 provides structure to attach the cushion assembly 34 of the seatback 24 to the structural support 32 of the seatback 24. The foam portion 126 provides cushioning and comfort for the occupant of the first seating assembly 14 when the vehicle 10 changes direction and the occupant interacts with the first bolster section 102.

Figure 22:
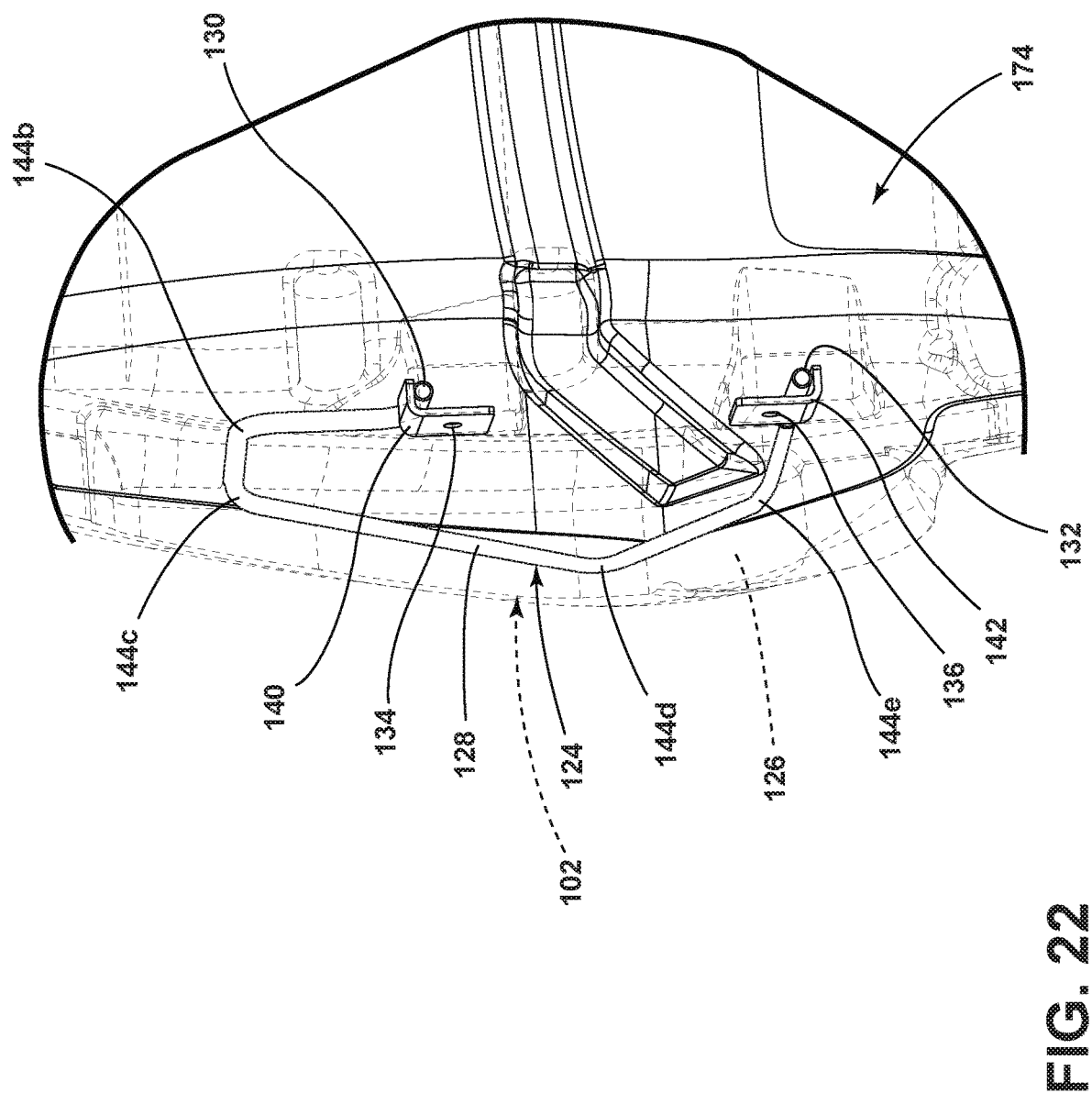
FIG. 22 is a rear view of area XXII of FIG. 17, with the foam portions of the first bolster section and the primary support section shown in phantom, illustrating the first metallic support element incorporating a first bracket attached to the first end and a second bracket attached to the second end, and the first bracket and the second bracket each incorporating an aperture to allow the cushion assembly to be attached to the support structure of the seatback.
Figure 23:
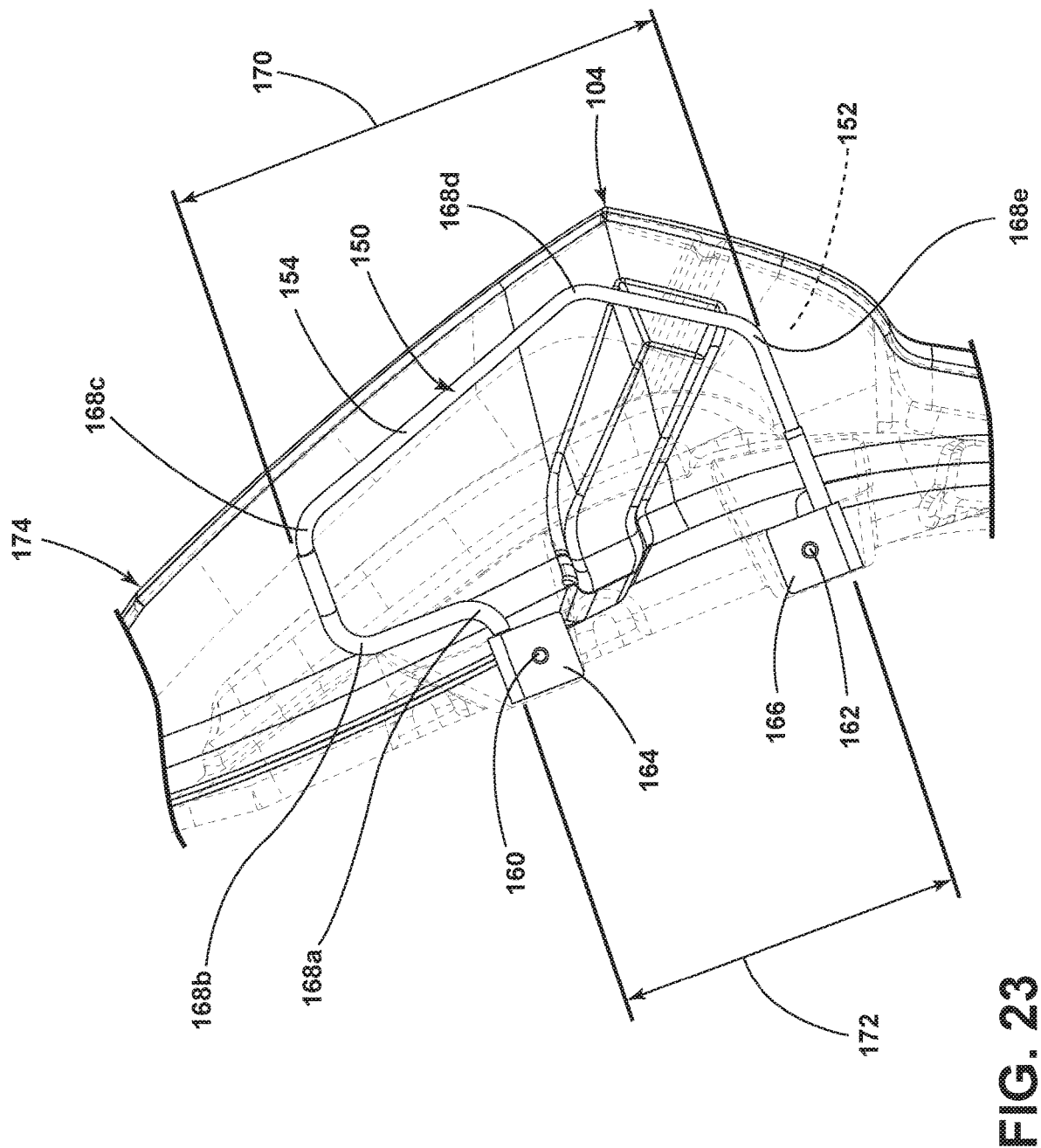
FIG. 23 is a side view of area XXIII of FIG. 18, with the foam portion of the second bolster section shown in phantom, illustrating the second metallic support element having a plurality of bends, and the distance between the first end and the second end is less than the distance between two nonadjacent bends forward of the first end and second end.

The first metallic support element 124 can include a tubular portion 128 between a first end 130 and a second end 132 (see FIG. 22). Alternatively, the first metallic support element 124 can be rod-like, without a hollowed interior that the tubular portion 128 provides. A tubular portion 128 requires less material and thus weighs less than a rod like first metallic support element 124. The first metallic support element 124 includes at least one aperture (such as a first aperture 134 and a second aperture 136 in the illustrated embodiment), which, as discussed further below, are disposed and configured to receive fasteners 138a, 138b, respectively (see FIG. 25), to attach the cushion assembly 34 of the seatback 24 to the structural support 32 of the seatback 24. The rod-like or tubular portion 128 separates the first aperture 134 and the second aperture 136. In the illustrated embodiment, the first metallic support element 124 includes a first bracket 140 disposed at the first end 130 and the first bracket 140 includes the first aperture 134. Similarly, in the illustrated embodiment, the first metallic support element 124 includes a second bracket 142 disposed at the second end 132 and the second bracket 142 includes the second aperture 136. The first bracket 140 and the second bracket 142 can each be a bent piece of metal welded or otherwise attached to the tubular portion 128. The rod-like or tubular portion 128 of the first metallic support element 124 of the illustrated embodiment includes a plurality of bends 144a-144e. Bends 144a-144e are disposed forward of the first end 130 and the second end 132. A distance 146 (see FIG. 21) between bend 144c and bend 144e is greater than a distance 148 between the first end 130 and the second end 132. Instead of incorporating the first bracket 140 to provide the first aperture 134, the first end 130 could be flattened and the first aperture 134 imparted (via drilling, stamping, or otherwise) through the first end 130. Similarly, instead of incorporating the second bracket 142 to provide the second aperture 136, the second end 132 could be flattened and the second aperture 136 imparted (via drilling, stamping, or otherwise) through the second end 132. The foam portion 126 can cover the entirety of the first metallic support element 124 except for so much of the first bracket 140 and the second bracket 142 to provide access to the first aperture 134 and second aperture 136. The first end 130 and the second end 132 of the first metallic support element 124 is disposed upward of the bottom 112 of the primary support section 100 and downward of the top 110 of the primary support section 100. The first aperture 134 at the first end 130 of the first metallic support element 124 is disposed closer to the top 110 of the primary support section 100 than the second aperture 136 at the second end 132 of the first metallic support element 124. The first end 130 and the second end 132 of the first metallic support element 124 point rearward from the rod-like or tubular portion 128.

The second bolster section 104 includes a second metallic support element 150 and a foam portion 152 at least partially surrounding the second metallic support element 150. The second metallic support element 150 provides support structure to help the second bolster section 104 maintain its shape and position and to counteract the force that the occupant imposes on the second bolster section 104 while the vehicle 10 is changing direction. In addition, the second metallic support element 150 provides additional structure to attach the cushion assembly 28 of the seatback 24 to the structural support 32 of the seatback 24. The foam portion 152 provides cushioning and comfort for the occupant of the first seating assembly 14 when the vehicle 10 changes direction and the occupant interacts with the second bolster section 104.

Figure 24:
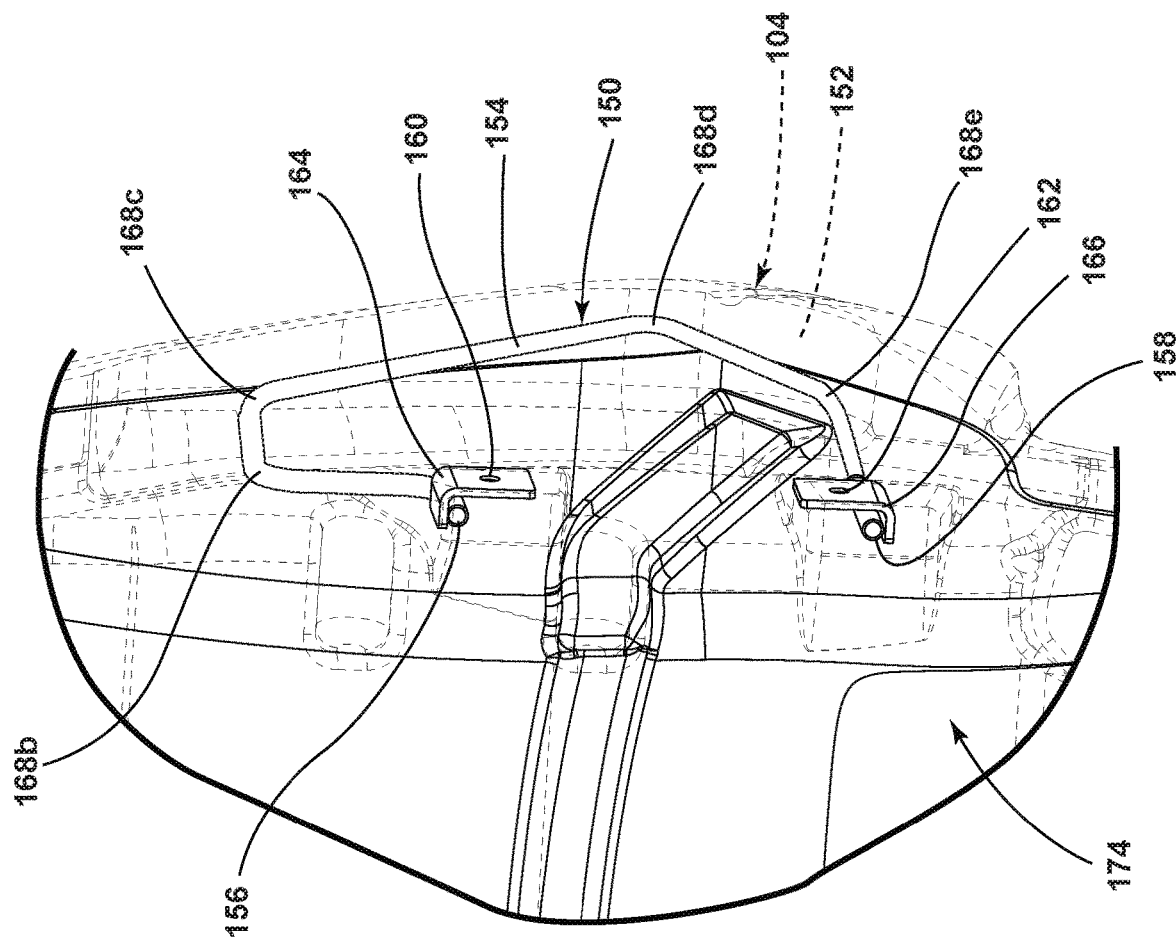
FIG. 24 is a rear view of area XXIV of FIG. 17, with the foam portions of the second bolster section and the primary support section shown in phantom, illustrating the second metallic support element incorporating a first bracket attached to the first end and a second bracket attached to the second end, and the first bracket and the second bracket each incorporating an aperture to allow the cushion assembly to be attached to the support structure of the seatback.

The second metallic support element 150 can include a tubular portion 154 between a first end 156 and a second end 158 (see FIG. 24). Alternatively, the second metallic support element 150 can be rod-like, without a hollowed interior that the tubular portion 154 provides. A tubular portion 154 requires less material and thus weighs less than a rod like second metallic support element 150. The second metallic support element 150 includes at least one aperture (such as a first aperture 160 and a second aperture 162 in the illustrated embodiment), which, as discussed further below, are disposed and configured to receive fasteners 138c, 138d (see FIG. 26) to attach the cushion assembly 34 of the seatback 24 to the structural support 32 of the seatback 24. The rod-like or tubular portion 154 separates the first aperture 160 and the second aperture 162. In the illustrated embodiment, the second metallic support element 150 includes a first bracket 164 disposed at the first end 156 and the first bracket 164 includes the first aperture 160. Similarly, in the illustrated embodiment, the second metallic support element 150 includes a second bracket 166 disposed at the second end 158 and the second bracket 166 includes the second aperture 162. The first bracket 164 and the second bracket 166 can each be a bent piece of metal welded or otherwise attached to the tubular portion 154. The rod-like or tubular portion 154 of the second metallic support element 150 of the illustrated embodiment includes a plurality of bends 168a-168e. Bends 168a-168e are disposed forward of the first end 156 and the second end 158. A distance 170 (see FIG. 23) between bend 168c and bend 168e is greater than a distance 172 between the first end 156 and the second end 158. Instead of incorporating the first bracket 164 to provide the first aperture 160, the first end 156 could be flattened and the first aperture 160 imparted (via drilling, stamping, or otherwise) through the first end 156. Similarly, instead of incorporating the second bracket 166 to provide the second aperture 162, the second end 158 could be flattened and the second aperture 162 imparted (via drilling, stamping, or otherwise) through the second end 158. The foam portion 152 can cover the entirety of the second metallic support element 150 except for so much of the first bracket 164 and the second bracket 166 to provide access to the first aperture 160 and second aperture 162. The first end 156 and the second end 158 of the second metallic support element 150 is disposed upward of the bottom 112 of the primary support section 100 and downward of the top 110 of the primary support section 100. The first aperture 160 at the first end 156 of the second metallic support element 150 is disposed closer to the top 110 of the primary support section 100 than the second aperture 162 at the second end 158 of the second metallic support element 150. The first end 156 and the second end 158 of the second metallic support element 150 point rearward from the rod-like or tubular portion 154.

Figure 15:
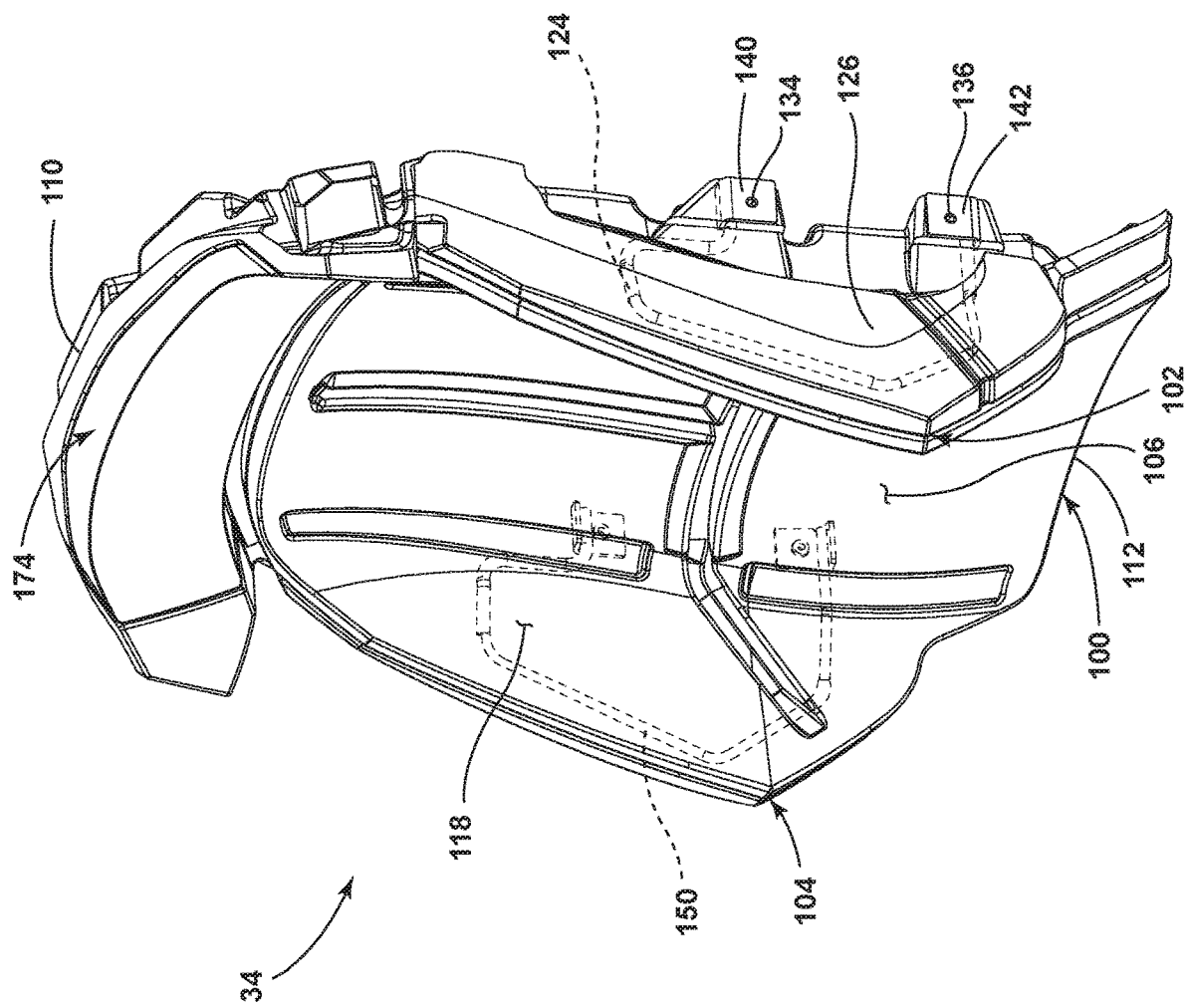
FIG. 15 is a perspective view of the cushion assembly of the seatback of FIG. 2, illustrating, in phantom, the first bolster section incorporating a first metallic support element and the second bolster section incorporating a second metallic support element.
Figure 15A:
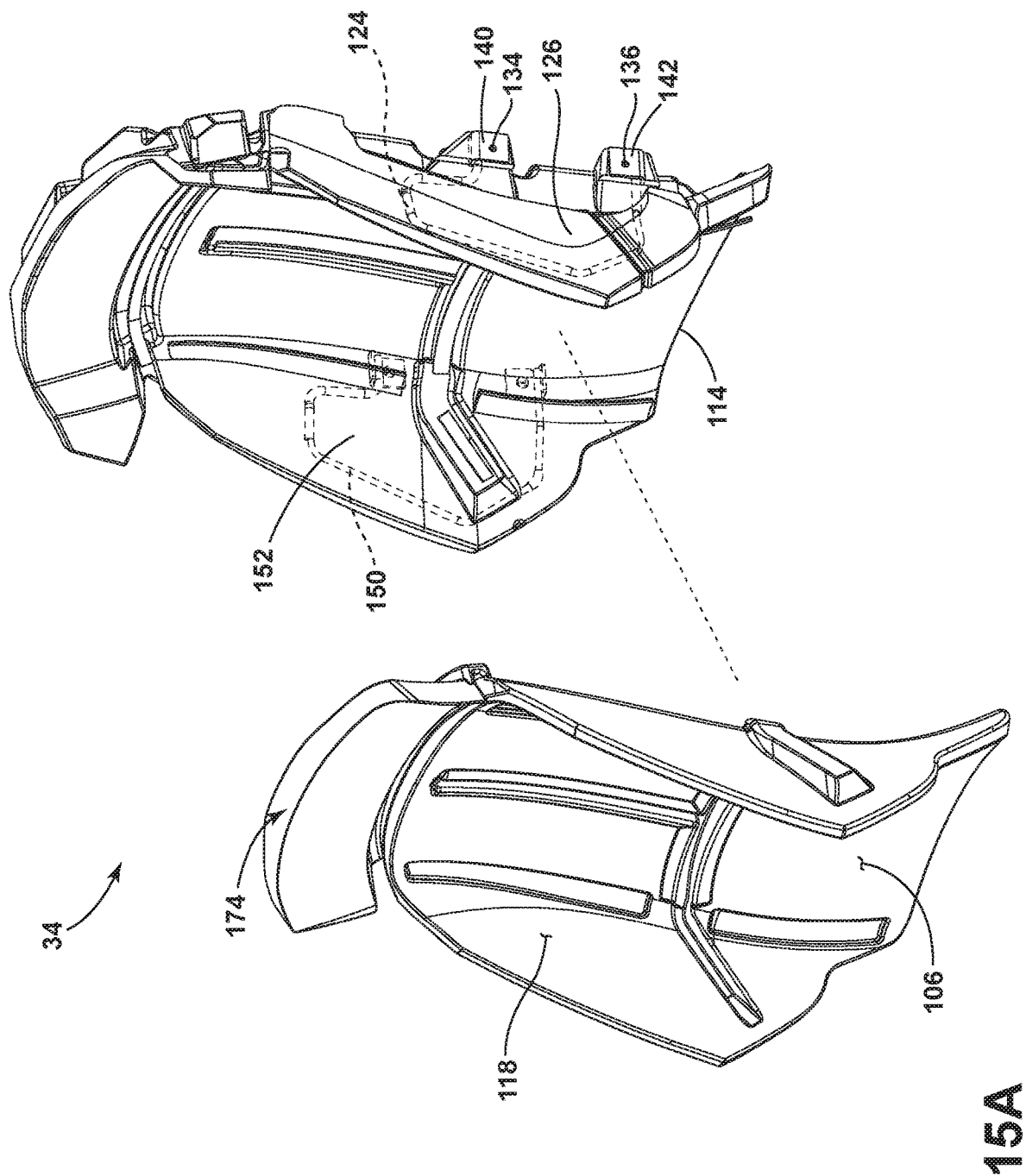
FIG. 15A is a blown-up perspective view of the cushion assembly of the seatback of FIG. 2, illustrating a second layer of foam attached to and enveloped by contiguous foam portions of the primary support section, the first bolster section, and the second bolster section.
Figure 16:
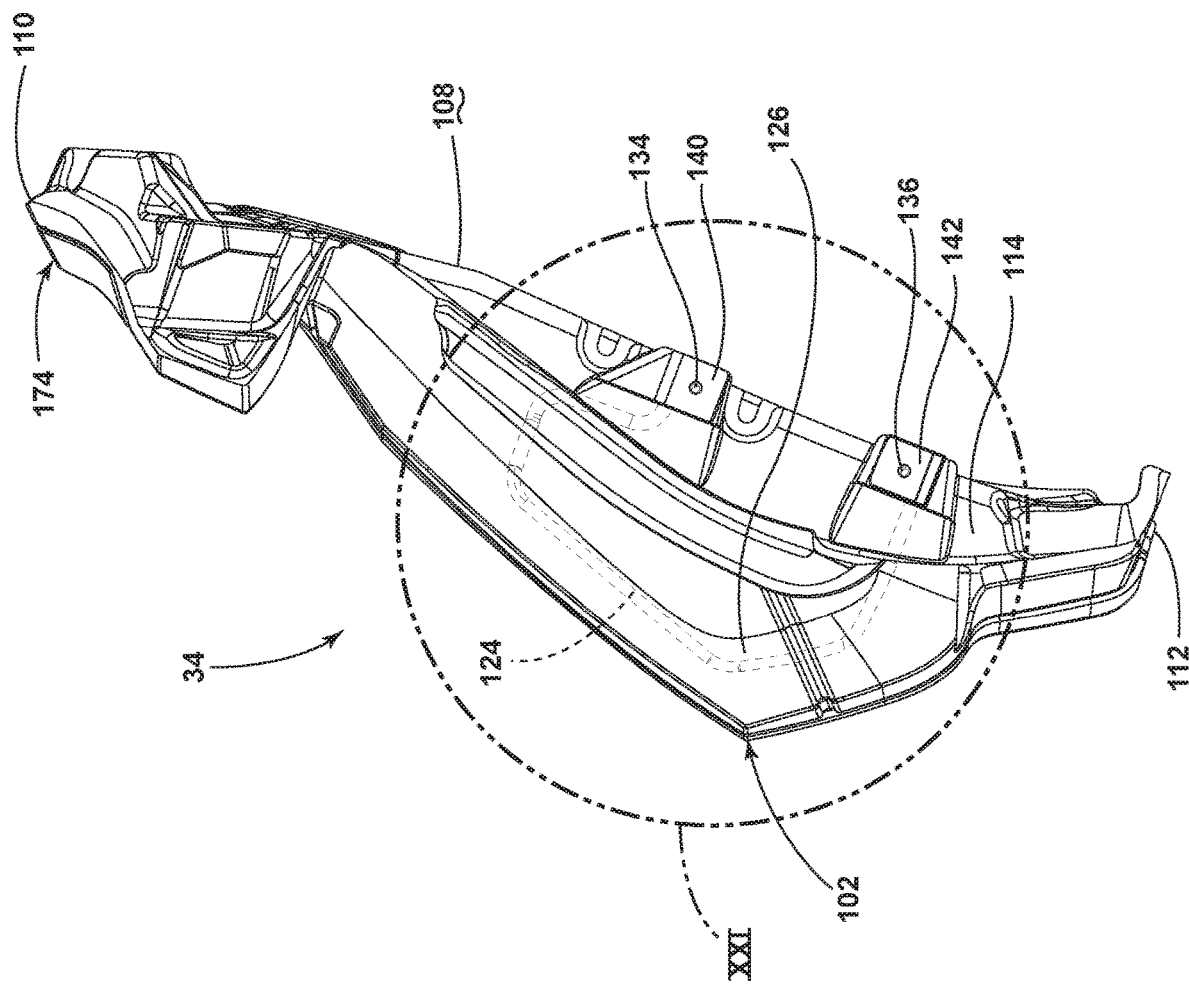
FIG. 16 is a side view of the cushion assembly of the seatback of FIG. 2, illustrating the foam portion of the first bolster section at least partially surrounding (as a result of an overmolding manufacturing method) the first metallic support element.
Figure 17:
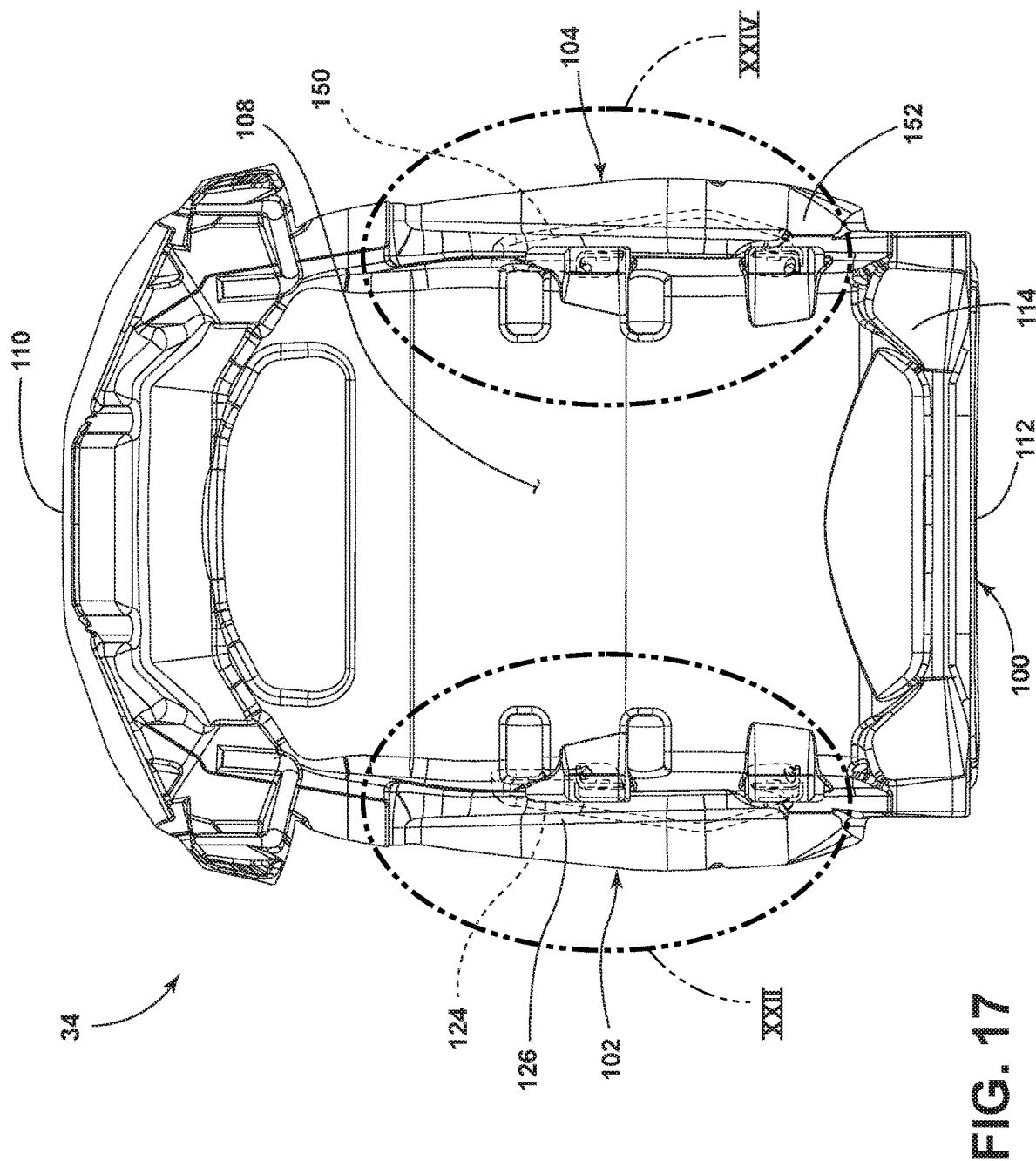
FIG. 17 is a rear view of the cushion assembly of the seatback of FIG. 2, illustrating a top, a bottom, and a rearward facing surface.
Figure 18:
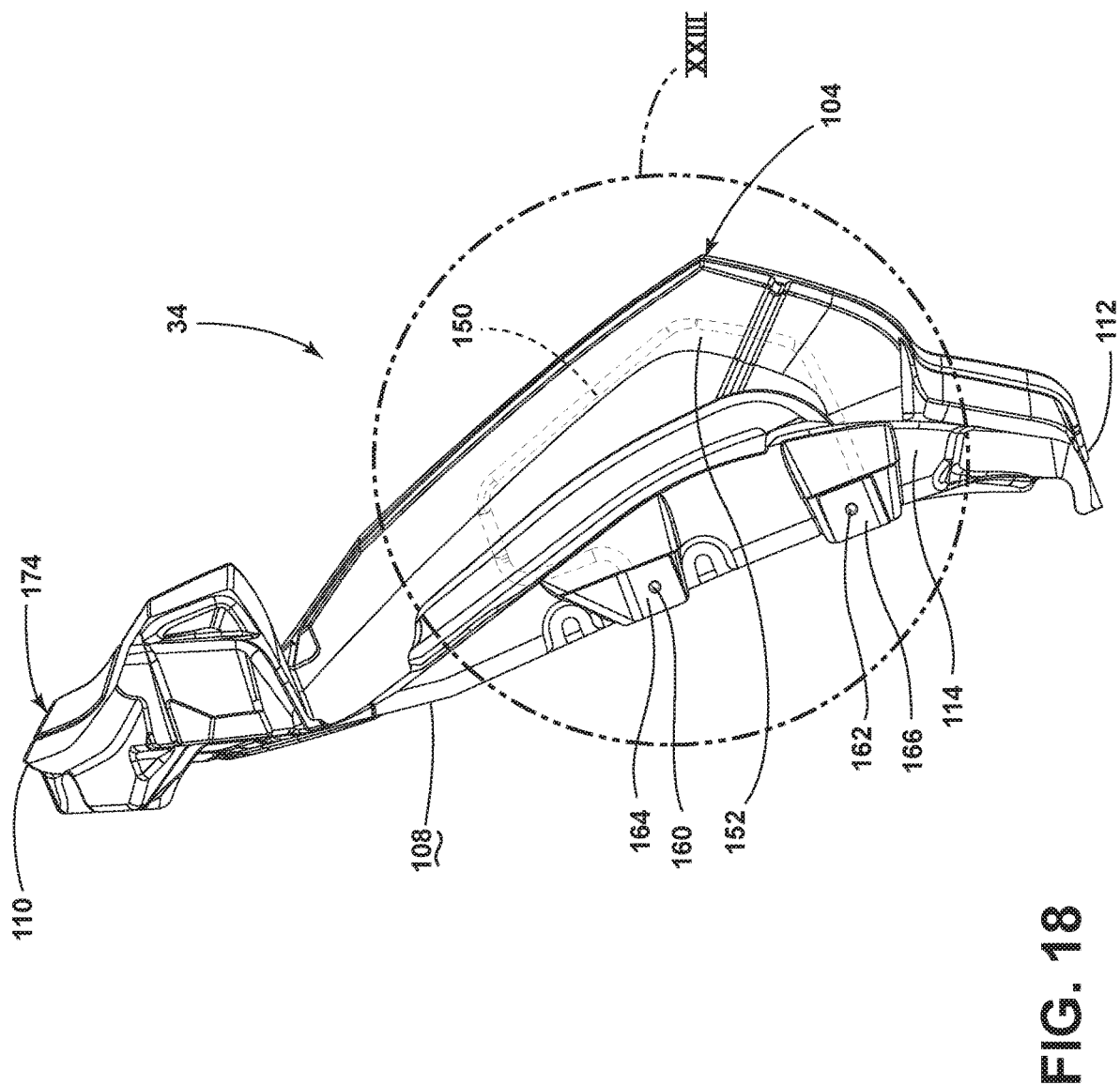
FIG. 18 is a side view of the cushion assembly of the seatback of FIG. 2, illustrating the foam portion of the second bolster section at least partially surrounding (as a result of an overmolding manufacturing method) the second metallic support element.
Figure 19:
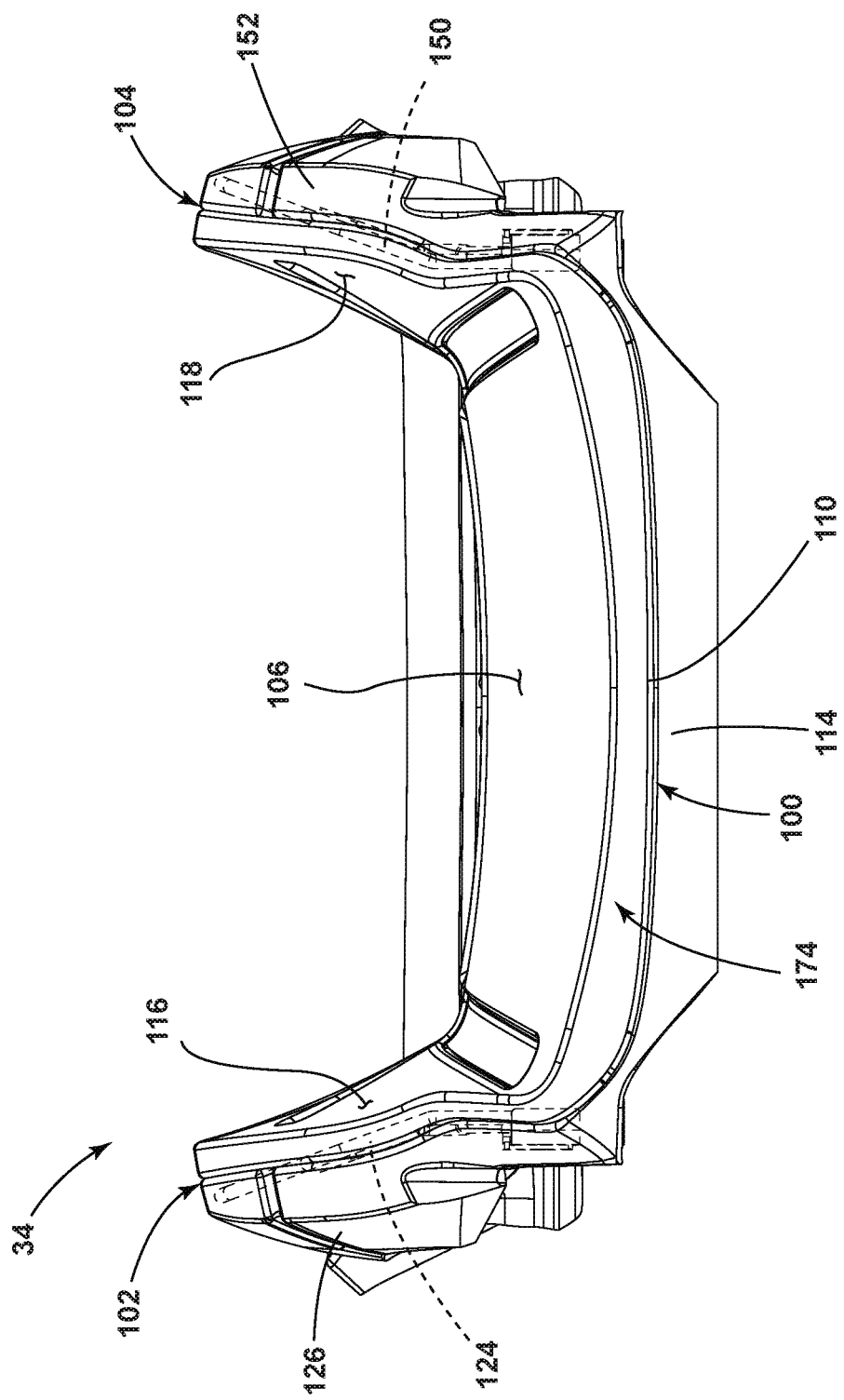
FIG. 19 is a top view of the cushion assembly of the seatback of FIG. 2, illustrating the first bolster section and the second bolster section each having an inward surface that extends generally forward and outward from the forward facing surface of the primary support section.
Figure 20:
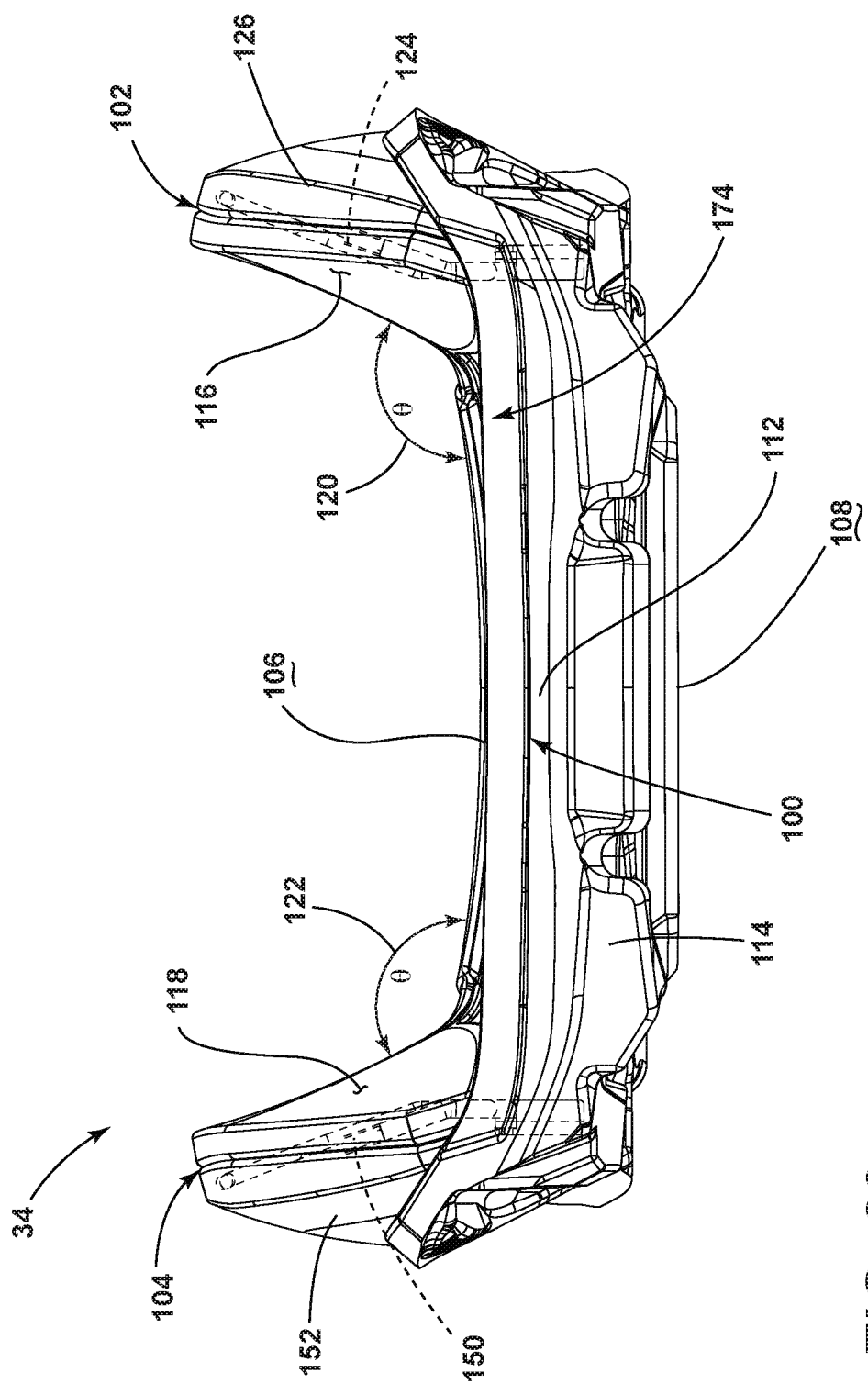
FIG. 20 is a bottom view of the cushion assembly of the seatback of FIG. 2, illustrating the inward surfaces of the first bolster section and the second bolster section forming an obtuse angle relative to the forward facing surface of the primary support section.
Figure 21:
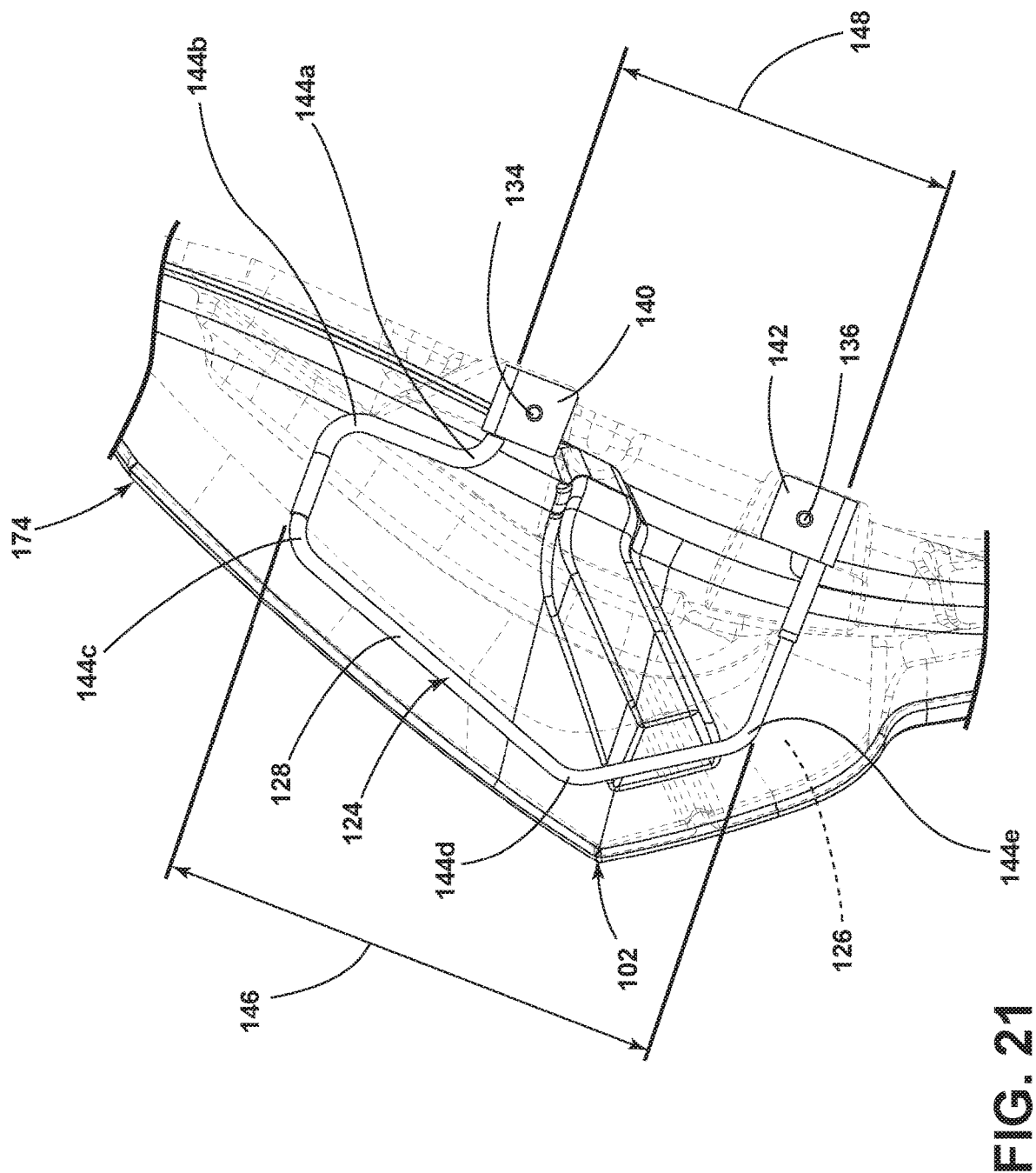
FIG. 21 is a side view of area XXI of FIG. 16, with the foam portion of the first bolster section shown in phantom, illustrating the first metallic support element having a plurality of bends, and the distance between the first end and the second end is less than the distance between two nonadjacent bends forward of the first end and second end.

As perhaps best shown in FIG. 15A, in the illustrated embodiment, the foam portions 114, 126, 152 of the primary support section 100, the first bolster section 102, and the second bolster section 104, respectively, of the cushion assembly 34 of the seatback 24 can be contiguous. That is, the foam portions 114, 126, 152 can be all part of one piece of foam. The cushion assembly 34 of the seatback 24 can further include a second layer of foam 174. The second layer of foam 174 covers at least a portion of the foam portions 114, 126, 152, which can be contiguous, of the primary support section 100, the first bolster section 102, and the second bolster section 104. For example, as in the illustrated embodiment, the second layer of foam 174 can be disposed forward of the foam portions 114, 126, 152 of the primary support section 100, the first bolster section 102, and the second bolster section 104, with the foam portions 114, 126, 152 of the primary support section 100, the first bolster section 102, and the second bolster section 104 cradling (that is, enveloping) the second layer of foam 174. The second layer of foam 174 can be a different type of foam than the foam portions 114, 126, 152, which can be contiguous, of the primary support section 100, the first bolster section 102, and the second bolster section 104. For example, the second layer of foam 174 can be a polyurethane foam, while the foam portions 114, 126, 152 of the primary support section 100, the first bolster section 102, and the second bolster section 104 can be an expanded polypropylene foam.

Figure 25:
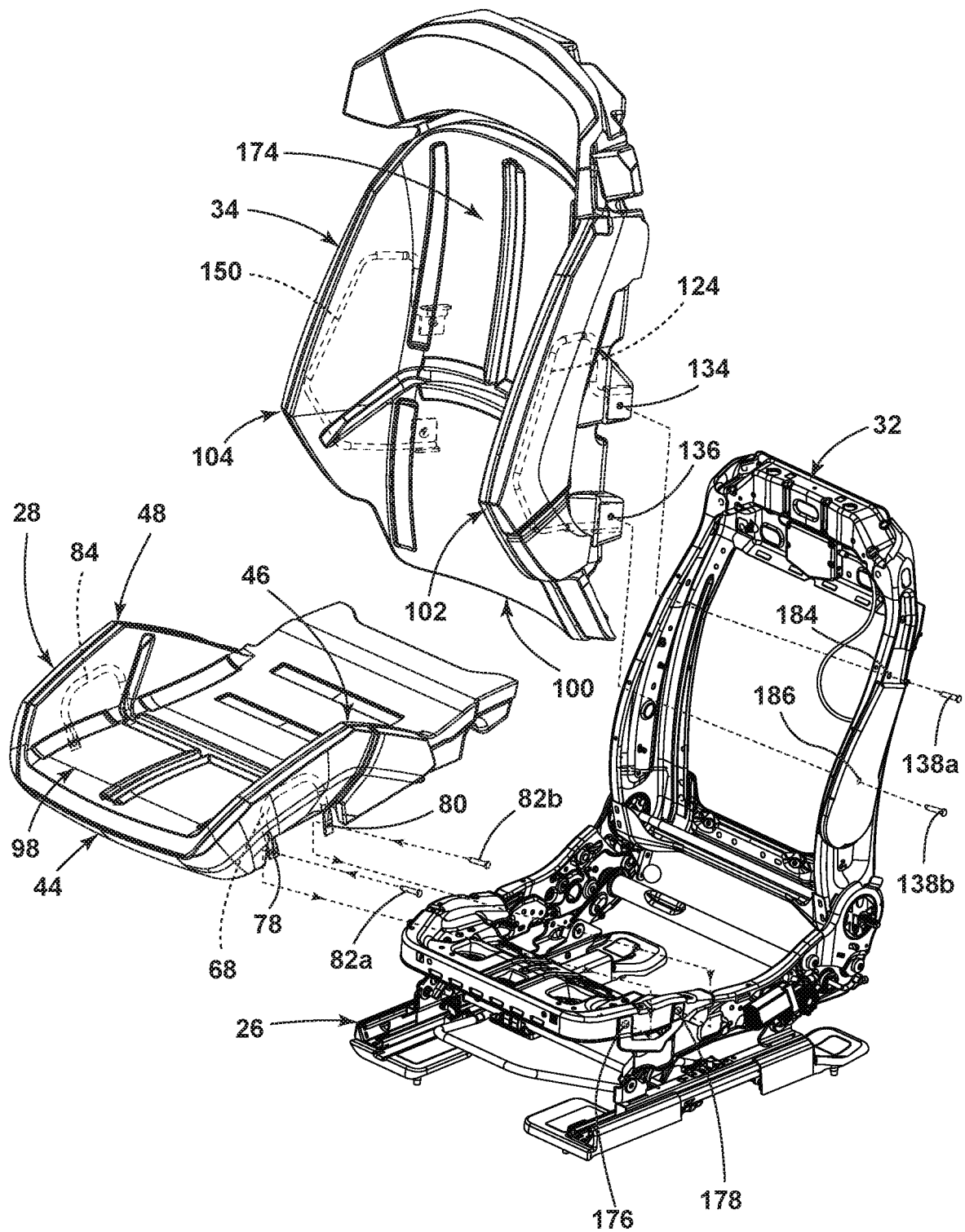
FIG. 25 is a perspective exploded view of the seat and seatback of FIG. 2, illustrating the attachment of the cushion assembly of the seat to the structural support of the seat, using fasteners extending through in-line apertures provided by the first metallic support element of the first bolster section and by the structural support at a first side, and further illustrating the attachment of the cushion assembly of the seatback to the structural support of the seatback, using fasteners extending through in-line apertures provided by the first metallic support element of the first bolster section and by the structural support at the first side.
Figure 26:
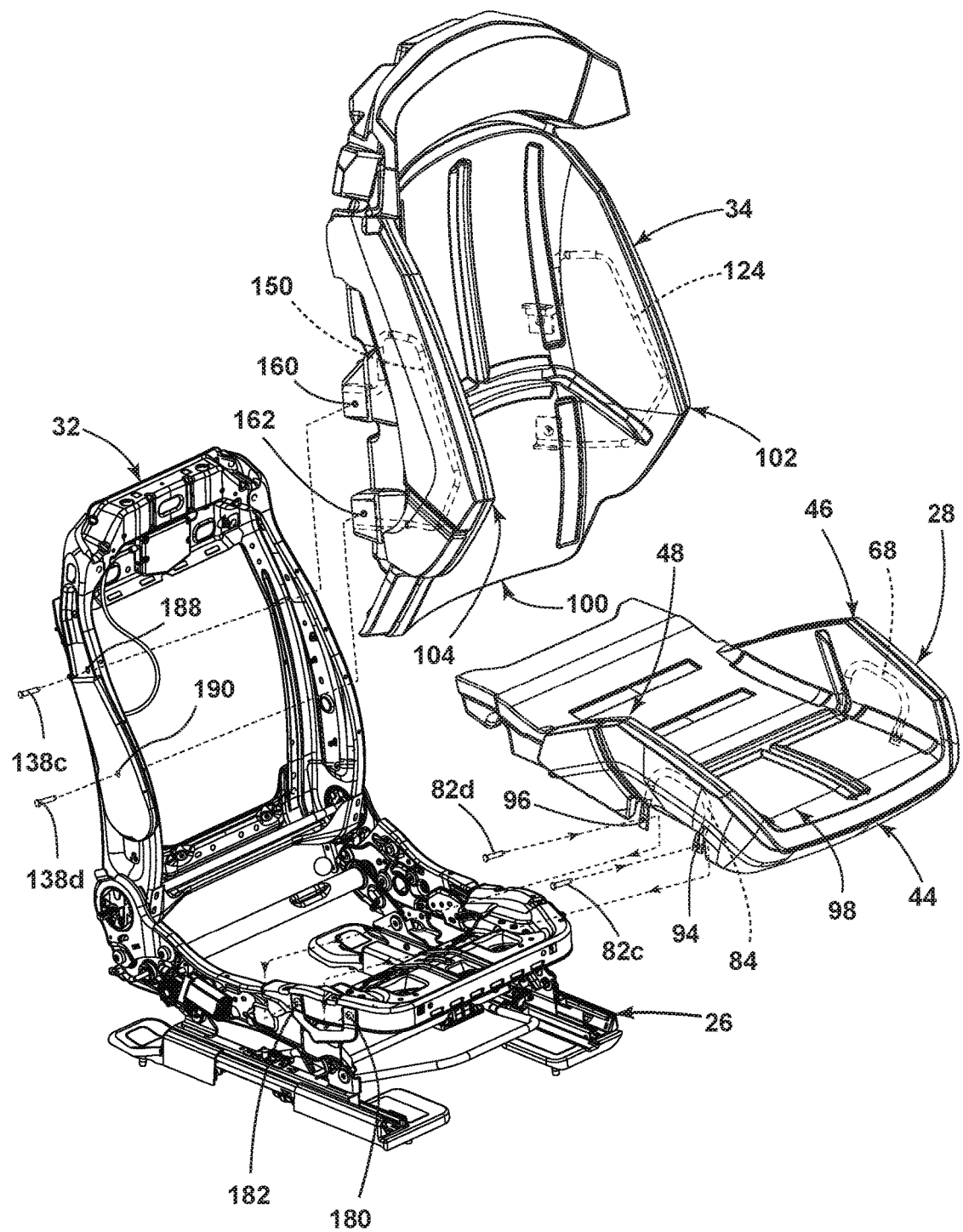
FIG. 26 is a perspective exploded view of the seat and seatback of FIG. 2, illustrating the attachment of the cushion assembly of the seat to the structural support of the seat, using fasteners extending through in-line apertures provided by the second metallic support element of the second bolster section and by the structural support at a second side, and further illustrating the attachment of the cushion assembly of the seatback to the structural support of the seatback, using fasteners extending through in-line apertures provided by the second metallic support element of the second bolster section and by the structural support at the second side.

Referring now to FIGS. 25 and 26, the first metallic support element 68 and the second metallic support element 84 of the cushion assembly 28 for the seat 22 provide structure to attach (such as fasten) the cushion assembly 28 of the seat 22 to the structural support 26 of the seat 22. More specifically, the first aperture 78 and the second aperture 80 of the first metallic support element 68 of the first bolster section 46 each receive a fastener, namely fastener 82a and fastener 82b, respectively. The structural support 26 of the seat 22 includes a first aperture 176 and a second aperture 178 disposed at the first side 40 of the first seating assembly 14. The first aperture 176 of the structural support 26 of the seat 22 at the first side 40 of the first seating assembly 14 is disposed in-line with the first aperture 78 of the first metallic support element 68 of the first bolster section 46, and thus both receive the same first fastener 82a to fasten the cushion assembly 28 to the structural support 26. Likewise, the second aperture 178 of the structural support 26 of the seat 22 at the first side 40 of the first seating assembly 14 is disposed in-line with the second aperture 80 of the first metallic support element 68 of the first bolster section 46, and thus both receive the same second fastener 82b to further fasten the cushion assembly 28 to the structural support 26. In the illustrated embodiment, the first aperture 176 and the second aperture 178 of the structural support 26 of the seat 22 disposed at the first side 40 of the first seating assembly 14 are closer to the midline 38 of the first seating assembly 14 than the first aperture 78 and the second aperture 80 of the first metallic support element 68 of the first bolster section 46. However, the first aperture 176 and the second aperture 178 need not be.

As for the second side 42 of the first seating assembly 14, the first aperture 94 and the second aperture 96 of the second metallic support element 84 of the second bolster section 48 each receive a fastener, namely fastener 82c and fastener 82d respectively. The structural support 26 of the seat 22 includes a first aperture 180 and a second aperture 182 disposed at the second side 42 of the first seating assembly 14. The first aperture 180 of the structural support 26 of the seat 22 at the second side 42 of the first seating assembly 14 is disposed in-line with the first aperture 94 of the second metallic support element 84 of the second bolster section 48, and thus both receive the same fastener 82c to further fasten the cushion assembly 28 of the seat 22 to the structural support 26. Likewise, the second aperture 182 of the structural support 26 of the seat 22 at the second side 42 is disposed in-line with the second aperture 96 of the second metallic support element 84 of the second bolster section 48, and thus both receive the same fastener 82d to further fasten the cushion assembly 28 to the structural support 26 of the seat 22. In the illustrated embodiment, the first aperture 180 and the second aperture 182 of the structural support 26 of the seat 22 disposed at the second side 42 of the first seating assembly 14 are closer to the midline 38 of the first seating assembly 14 than the first aperture 94 and the second aperture 96 of the second metallic support element 84 of the second bolster section 48. However, the first aperture 180 and the second aperture 182 need not be.

In a similar manner, the first metallic support element 124 and the second metallic support element 150 of the cushion assembly 34 of the seatback 24 provide structure to attach (such as fasten) the cushion assembly 34 of the seatback 24 to the structural support 32 of the seatback 24. More specifically, the first aperture 134 and the second aperture 136 of the first metallic support element 124 of the first bolster section 102 each receive a fastener, namely fastener 138a and fastener 138b respectively, to attach the cushion assembly 34 to the structural support 32. The structural support 32 of the seatback 24 includes a first aperture 184 and a second aperture 186 disposed at the first side 40 of the first seating assembly 14. The first aperture 134 of the first metallic support element 124 of the first bolster section 102 and the first aperture 184 of the structural support 32 disposed at the first side 40 are disposed in-line with each other and receive the same fastener 138a thus attaching the cushion assembly 34 to the structural support 32. Likewise, the second aperture 136 of the first metallic support element 124 of the first bolster section 102 and the second aperture 186 of the structural support 32 disposed at the first side 40 are disposed in-line with each other and receive the same fastener 138b thus attaching the cushion assembly 34 to the structural support 32 of the seatback 24.

As for the second side 42 of the first seating assembly 14, the first aperture 160 and the second aperture 162 of the second metallic support element 150 of the second bolster section 104 each receive a fastener, namely fastener 138c and fastener 138d respectively, to attach the cushion assembly 34 to the structural support 32 of the seatback 24. The structural support 32 of the seatback 24 includes a first aperture 188 and a second aperture 190 disposed at the second side 42 of the first seating assembly 14. The first aperture 160 of the second metallic support element 150 of the second bolster section 104 and the first aperture 188 of the structural support 32 disposed at the second side 42 are disposed in-line with each other and receive the same fastener 138c thus attaching the cushion assembly 34 to the structural support 32 of the seatback 24. Likewise, the second aperture 162 of the second metallic support element 150 of the second bolster section 104 and the second aperture 190 of the structural support 32 disposed at the second side 42 are disposed in-line with each other and receive the same fastener 138d thus attaching the cushion assembly 34 to the structural support 32 of the seatback 24. Thus, (i) the first end 74 and the second end 76 of the first metallic support element 68 of the first bolster section 46 of the cushion assembly 28 of the seat 22 are attached to the structural support 26 of the seat 22, (ii) the first end 90 and the second end 92 of the second metallic support element 68 of the second bolster section 48 of the cushion assembly 28 of the seat 22 are attached to the structural support 26 of the seat 22, (iii) the first end 130 and the second end 132 of the first metallic support element 124 of the first bolster section 102 of the cushion assembly 34 of the seatback 24 are attached to the structural support 32 of the seatback 24, and (iv) the first end 156 and the second end 158 of the second metallic support element 150 of the second bolster section 104 of the cushion assembly 34 of the seatback 24 are attached to the structural support 32 of the seatback 24.

The cushion assembly 28 of the seat 22 and the cushion assembly 34 of the seatback 24, including the first bolster sections 46, 102 and the second bolster sections 48, 104 thereof, can be manufactured via a novel method. As the first bolster sections 46, 102 and the second bolster sections 48, 104 of the cushion assembly 28 and the cushion assembly 34 can be manufactured using the same method, only the manufacture of the first bolster section 46 of the cushion assembly 28 of the seat 22 will be particularly discussed herein, unless otherwise noted. The method includes presenting the first metallic support element 68, which can include the tubular portion 72. The method further includes overmolding the tubular portion 72 of the first metallic support element 68 with foam to form the foam portion 70 of the first bolster section 46 of the cushion assembly 28. The tubular portion 72 of the first metallic support element 68 can be bent to a predetermined shape, such as the shape utilized in the illustrated embodiment or another predetermined shape, before overmolding the tubular portion with foam. The predetermined shape can be a U-shape. However, as in the case of the first metallic support element 124 of the first bolster section 102 of the cushion assembly 34 of the seatback 24, the predetermined shape can include a plurality of bends 144a-144e, such as at least five bends 144a-144e, to reach the desired predetermined shape. The first end 74 and the second end 76 of the first metallic support element 68 can be left free of overmolded foam. The method can further include flattening the first end 74 and the second end 76 and drilling apertures 78, 80 through the flattened first end 74 and second end 76, respectively, to provide fastening capability as described above. The method can further include applying the second layer of foam 98 over the foam portion 70 overmolded over the tubular portion 72 of the first metallic support element 68. As discussed above, the second layer of foam 98 can be a different type of foam than the foam portion 70 overmolded over the tubular portion 72.

By utilizing the first metallic support element 68 and the second metallic support element 84 to provide structural support for the first bolster section 46 and the second bolster section 48 of the cushion assembly 28 for the seat 22, and the first metallic support element 124 and second metallic support element 150 to provide structural support for the first bolster section 102 and the second bolster section 104 of the cushion assembly 34 for the seatback 24, the use of uncomfortable and heavy metal plates welded to the structural supports 26, 32 to provide structural support for the first bolster section 46, the second bolster section 48, the first bolster section 102, and the second bolster section 104 can be avoided. The tubular portions 72, 88, 128, 154 of the first metallic support element 68, the second metallic support element 84, the first metallic support element 124, and second metallic support element 150, respectively, can be thin-walled and thus can be formed from a smaller gauge metal material than the heavy metal plates described above commonly welded to the structural supports for the seat 22 and seatback 24. Because the first metallic support element 68, the second metallic support element 84, the first metallic support element 124, and second metallic support element 150, include apertures 78, 80, 94, 96, 134, 136, 160, and 162, the first metallic support element 68, the second metallic support element 84, the first metallic support element 124, and second metallic support element 150 can be attached to the structural supports 26, 32 without the use of welding. Because the tubular portions 72, 88, 128, 154 are overmolded foam in the manner described above, first metallic support element 68, the second metallic support element 84, the first metallic support element 124, and second metallic support element 150 do not cause the occupant of the first seating assembly 14 to experience discomfort.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seating assembly for a vehicle comprising:
a seat and a seatback, each comprising a structural support and a cushion assembly attached to the structural support;
wherein, each of the cushion assemblies of the seat and the seatback comprises:
a primary support section positioned to support an occupant of the vehicle, the primary support section comprising a foam portion;
a first bolster section disposed laterally to one side of the primary support section; and
a second bolster section disposed laterally to another side of the primary support section;
wherein, each of the first bolster section and the second bolster section comprises a metallic support element and a foam portion at least partially surrounding the metallic support element; and
wherein, each of the metallic support elements comprises a first end attached to the structural support, a second end attached to the structural support, and a rod-like or tubular portion between the first end and the second end.

2. The seating assembly of claim 1,
wherein, each of the metallic support elements of the first bolster section and the second bolster section of both of the cushion assemblies comprises a first aperture at the first end and a second aperture at the second end receiving a fastener attaching the metallic support element to the structural support.

3. The seating assembly of claim 1,
wherein, the primary support section of the cushion assembly of the seatback further comprises a bottom and a top;
wherein, the first end and the second end of the metallic support elements of the first bolster section and the second bolster section of the cushion assembly of the seatback are disposed upward of the bottom of the primary support section and downward of the top of the primary support section;
wherein, the primary support section of the cushion assembly of the seat further comprises a forward end and a rear end; and
wherein, the first end and the second end of the metallic support elements of the first bolster section and the second bolster section of the cushion assembly of the seat are disposed rearward of the forward end of the primary support section and forward of the rear end of the primary support section.

4. The seating assembly of claim 1,
the foam portions of the primary support section, the first bolster section, and the second bolster section of both cushion assemblies are contiguous; and
both cushion assemblies further comprise a second layer of foam disposed over and partially enveloped by the contiguous foam portions of the primary support section, the first bolster section, and the second bolster section.

5. The seating assembly of claim 1,
the rod-like or tubular portion of each of the metallic support elements is a tubular portion.

6. The seating assembly of claim 1 further comprising:
the metallic support elements of the cushion assembly of the seat have a generally upside-down U-shape with the first end and the second end pointing downward from the rod-like or tubular portion; and
the first end and the second end of the metallic support elements of the cushion assembly of the seatback point rearward from the rod-like or tubular portion.

7. The seating assembly of claim 1,
the primary support section of the cushion assembly of the seatback comprises a top, and the first end of each of the metallic support elements of the cushion assembly of the seatback is disposed closer to the top than the second end; and
the primary support section of the cushion assembly of the seat comprises a forward end, and the first end of each of the metallic support elements of the cushion assembly of the seat is disposed closer to the forward end than the second end.

8. A seatback cushion assembly for a seating assembly of a vehicle comprising:
a primary support section positioned to support a back of an occupant of the vehicle, the primary support section comprising a foam portion, a bottom, and a top;
a first bolster section disposed laterally to one side of the primary support section; and
a second bolster section disposed laterally to another side of the primary support section;
wherein, each of the first bolster section and the second bolster section comprises a metallic support element and a foam portion at least partially surrounding the metallic support element;
wherein, the metallic support elements of the first bolster section and the second bolster section each comprises a first end, a second end, and a rod-like or a tubular portion between the first end and the second end;
wherein, the metallic support elements of the first bolster section and the second bolster section each comprises a first aperture at the first end and a second aperture at the second end to allow attachment of the seatback cushion assembly to a structural support of the seating assembly; and
wherein, the first end and the second end of the metallic support elements of the first bolster section and the second bolster section are disposed upward of the bottom of the primary support section and downward of the top of the primary support section.

9. The seatback cushion assembly of claim 8,
the first end and the second end of the metallic support element of each of the first bolster section and the second bolster section point rearward from the rod-like or tubular portion.

10. The seatback cushion assembly of claim 8,
the rod-like or tubular portion of the metallic support element of the first bolster section and the second bolster section is a tubular portion.

11. The seatback cushion assembly of claim 8,
the foam portions of the first bolster section and the second bolster section cover the entireties of the metallic support elements of the first bolster section and the second bolster section except for so much to provide access to the first aperture and the second aperture of each of the metallic support elements.

12. The seatback cushion assembly of claim 8,
the foam portions of the primary support section, the first bolster section, and the second bolster section are contiguous; and
the seatback cushion assembly further comprises a second layer of foam disposed forward of and cradled by the contiguous foam portions of the primary support section, the first bolster section, and the second bolster section.

13. The seatback cushion assembly of claim 8,
for each of the first bolster section and the second bolster section, the first aperture at the first end of the metallic support element is disposed closer to the top of the primary support section than the second aperture at the second end of the metallic support element.

14. The seatback cushion assembly of claim 8,
the rod-like or tubular portion of the metallic support element of the first bolster section and the second bolster section comprises a plurality of bends that are disposed forward of the first end and the second end; and
a distance between two bends of the plurality of bends is greater than a distance between the first end and the second end.

15. A seat cushion assembly for a seating assembly of a vehicle comprising:
a primary support section positioned to support an occupant of the seating assembly, the primary support section comprising a foam portion, a forward end, and a rearward end;
a first bolster section disposed laterally to one side of the primary support section; and
a second bolster section disposed laterally to another side of the primary support section;
wherein, each of the first bolster section and the second bolster section comprises a metallic support element and a foam portion at least partially surrounding the metallic support element;
wherein, the metallic support elements of the first bolster section and the second bolster section each comprises a first end, a second end, and a rod-like or a tubular portion between the first end and the second end;
wherein, the first end and the second end of the metallic support elements of the first bolster section and the second bolster section comprise an aperture available to allow the attachment of the seat cushion assembly to a structural support of the seating assembly; and
wherein, the first end and the second end of the metallic support elements of the first bolster section and the second bolster section are disposed rearward of the forward end of the primary support section and forward of the rear end of the primary support section.

16. The seat cushion assembly of claim 15,
the foam portions of the primary support section, the first bolster section, and the second bolster section are contiguous; and
the seat cushion assembly further comprises a second layer of foam disposed above and partially enveloped by the contiguous foam portions of the primary support section, the first bolster section, and the second bolster section.

17. The seat cushion assembly of claim 15,
the foam portion of the first bolster section surrounds at least part of the rod-like or tubular portion of the metallic support element of the first bolster section but does not surround the apertures of the first end and the second end of the metallic support element of the first bolster section; and
the foam portion of the second bolster section surrounds at least part of the rod-like or tubular portion of the metallic support element of the second bolster section but does not surround the apertures of the first end and the second end of the metallic support element of the second bolster section.

18. The seat cushion assembly of claim 15,
the rod-like or tubular portion of the metallic support element of the first bolster section and the second bolster section is a tubular portion.

19. The seat cushion assembly of claim 15,
the metallic support element of each of the first bolster section and the second bolster section has a generally upside-down U-shape with the first end and the second end pointing downward from the rod-like or tubular portion.

20. The seat cushion assembly of claim 15,
the aperture of the first end of the metallic support element of the first bolster section is disposed forward of the aperture of the second end of the metallic support element of the first bolster section; and
the aperture of the first end of the metallic support element of the second bolster section is disposed forward of the aperture of the second end of the metallic support element of the second bolster section.

* * * * *